United States Patent
Nourai et al.

(10) Patent No.: US 10,573,078 B2
(45) Date of Patent: Feb. 25, 2020

(54) TECHNIQUE FOR RECORDING AUGMENTED REALITY DATA

(71) Applicant: Magic Leap, Inc., Plantation, FL (US)

(72) Inventors: Reza Nourai, Dublin, CA (US); Michael Harold Liebenow, Loxahatchee, FL (US); Robert Blake Taylor, Porter Ranch, CA (US); Robert Wyatt, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 3 days.

(21) Appl. No.: 15/924,144

(22) Filed: Mar. 16, 2018

(65) Prior Publication Data
US 2018/0268611 A1    Sep. 20, 2018

Related U.S. Application Data

(60) Provisional application No. 62/472,923, filed on Mar. 17, 2017.

(51) Int. Cl.
*G09G 5/00* (2006.01)
*G06T 19/00* (2011.01)

(52) U.S. Cl.
CPC .. *G06T 19/006* (2013.01); *G06T 2207/30244* (2013.01)

(58) Field of Classification Search
CPC .................................................. G06T 19/006
See application file for complete search history.

(56) References Cited

U.S. PATENT DOCUMENTS

| | | | |
|---|---|---|---|
| 9,417,452 B2 | 8/2016 | Schowengerdt et al. | |
| 9,671,566 B2 | 6/2017 | Abovitz et al. | |
| 2006/0146138 A1 | 7/2006 | Xin et al. | |
| 2010/0033484 A1* | 2/2010 | Kim | G06T 19/006 345/426 |
| 2013/0013664 A1* | 1/2013 | Baird | H04L 67/025 709/203 |
| 2013/0249900 A1* | 9/2013 | Lee | G06T 19/006 345/419 |
| 2013/0311548 A1 | 11/2013 | Huang et al. | |
| 2014/0354515 A1* | 12/2014 | LaValle | G02B 27/017 345/8 |
| 2016/0210783 A1 | 7/2016 | Tomlin et al. | |
| 2016/0246605 A1 | 8/2016 | Lerios | |

OTHER PUBLICATIONS

PCT International Search Report and Written Opinion for International Appln. No. PCT/US18/23025, Applicant Magic Leap, Inc., forms PCT/ISA/210, 220, and 237, dated Jun. 11, 2018 (10 pages).
Bautin, M., et al., "Graphic Engine Resource Mangement," Multimedia Computing and Networking, SPIE vol. 6818, dated 2008 (12 pages).
Extended European Search Report for EP Patent Appln. No. 18768170.5 dated Dec. 12, 2019.

\* cited by examiner

*Primary Examiner* — Charles Tseng
(74) *Attorney, Agent, or Firm* — Vista IP Law Group LLP

(57) ABSTRACT

Disclosed is an improved approach for generated recordings from augmented reality systems from the perspective of a camera within the system. Instead of re-using rendered virtual content from the perspective of the user's eyes for AR recordings, additional virtual content is rendered from an additional perspective specifically for the AR recording. That additional virtual content is combined with image frames generated by a camera to form the AR recording.

21 Claims, 27 Drawing Sheets

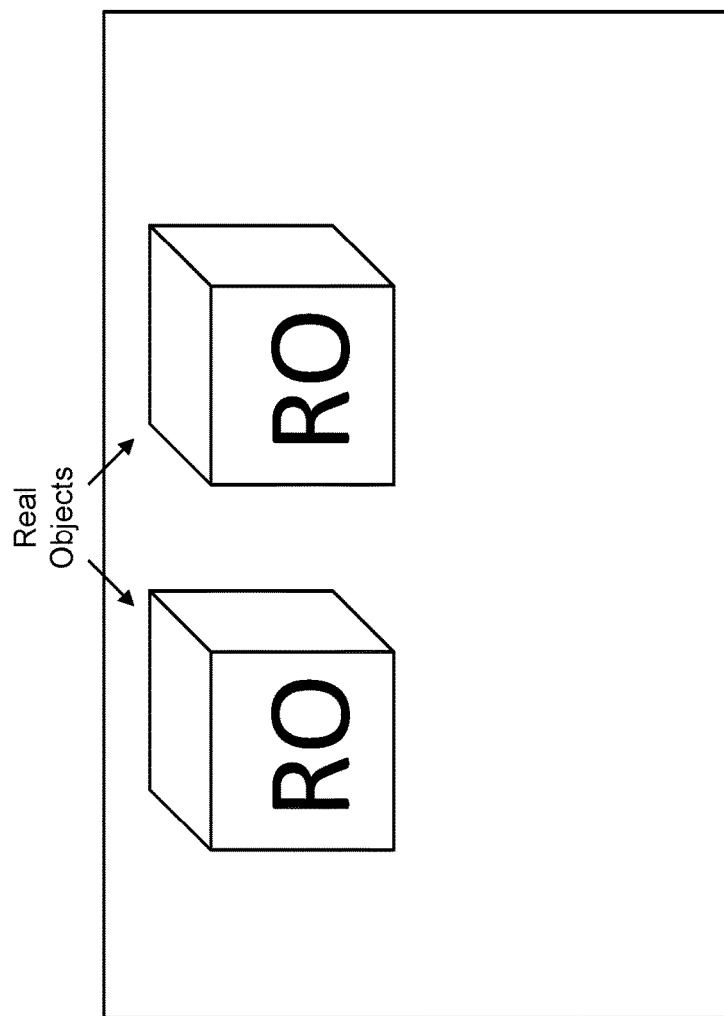

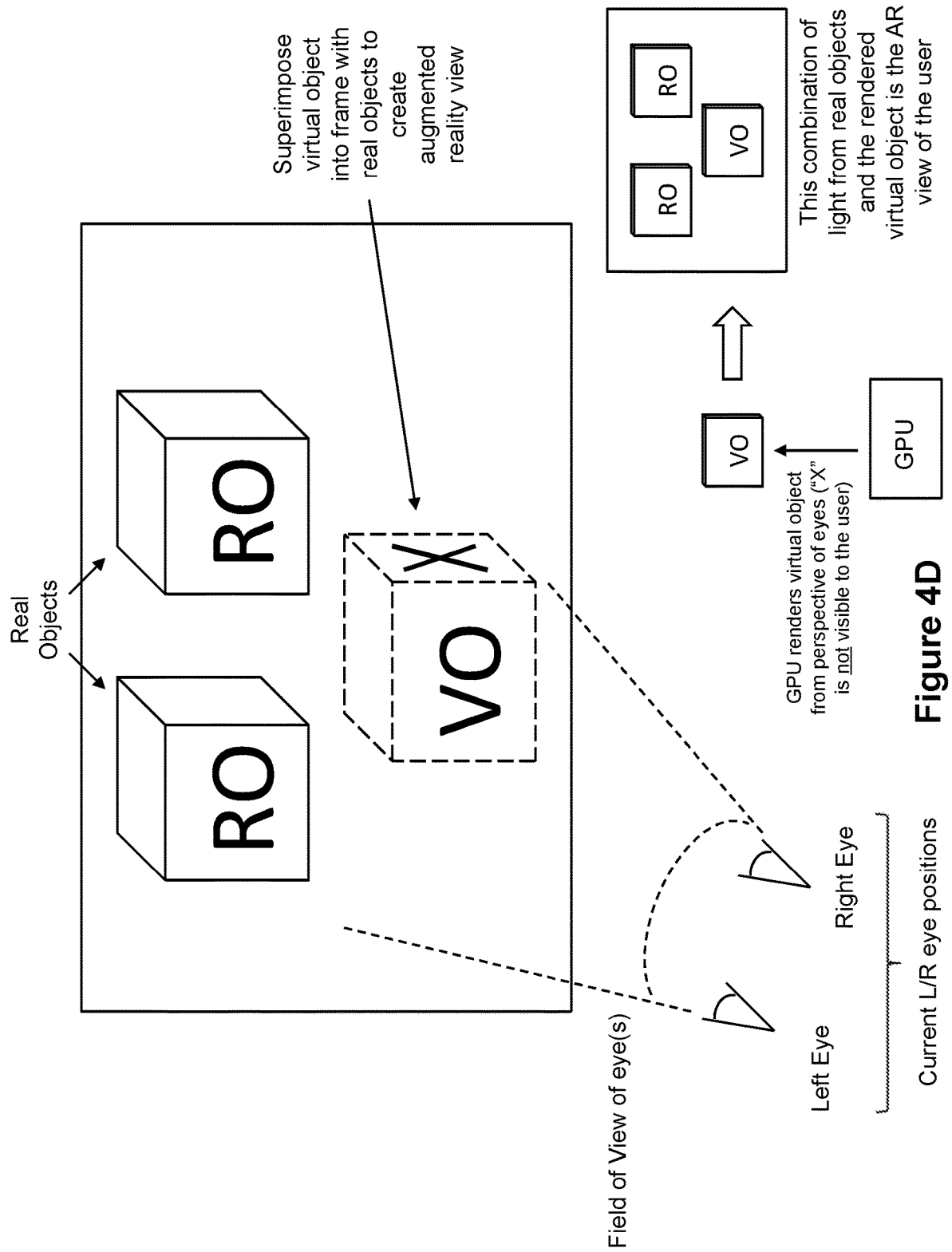

TECHNIQUE FOR RECORDING AUGMENTED REALITY DATA

CROSS-REFERENCE TO RELATED APPLICATIONS

The present claims the benefit of priority to U.S. Provisional Application Ser. No. 62/472,923, filed on Mar. 17, 2017, which is hereby incorporated by reference in its entirety.

FIELD OF THE INVENTION

The present disclosure generally relates to augmented reality technologies.

BACKGROUND

Modern computing and display technologies have facilitated the development of systems for so-called "virtual reality" or "augmented reality", where digitally reproduced images, or portions thereof, are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual real-world around a user.

VR and AR systems typically employ wearable display devices (e.g., head-worn displays, helmet-mounted displays, or smart glasses) that are at least loosely coupled to a user's head, and thus move when the end user's head moves. If the end user's head motions are detected by the display system, the data being displayed can be updated to take the change in head pose (e.g., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR provide concurrent viewing of both real and virtual objects. With an "optical see-through" display, the end user can see through transparent (or semi-transparent) elements in the display system to view directly the light from real objects in the environment. The transparent element, often referred to as a "combiner," superimposes light from the display over the end user's view of the real world, where light produced by the display projects an image of the virtual content over the see-through view of the real world. A camera may be mounted onto the wearable display to capture images or videos of the scene being viewed by the user.

When operating the wearable display, the user may seek to preserve a recording of his or her experience in operating the AR device. For example, gamers that play electronic video games often choose to create a recording of the real-time action of the gameplay, where the recording can be played back at a later moment in time. In the context of AR systems, this means that the recording should include a recording of the combined real and virtual objects during operation of the display system.

The problem is that virtual objects in the AR system are rendered from the perspective of the user's eyes/head, whereas the camera that is actually recording the real objects is normally mounted at a different location and/or viewing angle from the user's eyes. This means that a recording which simply combines the rendered virtual objects with the recording of the real objects will show the virtual objects from a first perspective and the real objects from a second perspective—potentially creating a significant disconnect in the orientation and/or content of the virtual objects in the final image product for a given image frame of the recording.

To address this, "warping" may be applied to change the way that the virtual objects are presented in the video recording. This approach takes the virtual objects rendered from the first perspective, and shifts the way that the virtual objects are presented to attempt to display those virtual objects from the second perspective. One problem with this approach is that when a virtual object is originally rendered from the first perspective, the rendered virtual object may not include displayable information about the virtual object from the second perspective. For example, when a second virtual object is hidden behind a first virtual object from the perspective of the user's eyes (i.e., the first perspective), then a rendering of the virtual content may only show the first virtual object and not the second (hidden) virtual object which is viewable from the perspective of the camera (i.e., the second perspective). This means that even when warping is performed on the virtual content, the warped virtual content that only includes content for the first virtual object and will still be missing content for the second virtual object that is viewable from the perspective of the camera. This approach therefore may create video artifacts that affect the content veracity of the recorded image/video frames.

Another potential problem with this approach is that it introduces latency as the AR equipment and application attempts to perform the necessary processing to warp the virtual content for the recording. This may introduce perceptible delays in generating the real-time images for display to the user on the wearable display.

Therefore, there is a need for an improved approach to generate AR recordings having a combination of recorded real objects and rendered virtual objects.

SUMMARY

In accordance with some embodiments, instead of re-using rendered virtual content from a perspective of a user's eyes for augmented reality (AR) recordings, additional virtual content is rendered from an additional perspective specifically for the AR recording. That is, virtual content is rendered from a perspective of a camera for AR recordings. That additional virtual content is combined with image frames generated by the camera to form the AR recording. To reduce latency and computing overhead, gaps in normal GPU processing may be leveraged to perform the additional rendering of the virtual content.

Additional and other objects, features, and advantages of the disclosure are described in the detail description, figures and claims.

BRIEF DESCRIPTION OF THE DRAWINGS

The drawings illustrate the design and utility of preferred embodiments of the present disclosure, in which similar elements are referred to by common reference numerals. In order to better appreciate how the above-recited and other advantages and objects of the present disclosures are obtained, a more particular description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 4A-G provide an illustration of the warping approach to implement AR recording, according to some embodiments.

DETAILED DESCRIPTION

The present disclosure is directed to an approach to implement augmented reality (AR) recordings using "third eye" virtual content rendering. According to some embodiments, instead of re-using rendered virtual content from a perspective of a user's eyes for AR recordings, additional virtual content is rendered from a perspective of the camera, and that additional virtual content is combined with the camera recording of a real world to form the AR recording. In some embodiments, gaps in normal GPU processing may be leveraged to perform the additional rendering to generate the additional virtual content rendering.

This disclosure will first provide a description of an illustrative AR system with which some embodiments of the disclosure may be practiced, followed by a description of one or more embodiments of an improved process and mechanism to generate AR content for recordings.

Illustrative Augmented Reality System

The description that follows pertains to an illustrative augmented reality (AR) system (which may be referred to herein as any of "augmented reality system", "AR system", or "mixed reality system") with which the disclosure may be practiced. However, it is to be understood that the disclosure also lends itself to applications in other types of augmented reality and virtual reality systems, and therefore the disclosure is not to be limited to only the illustrative system disclosed herein.

Figure 1A:
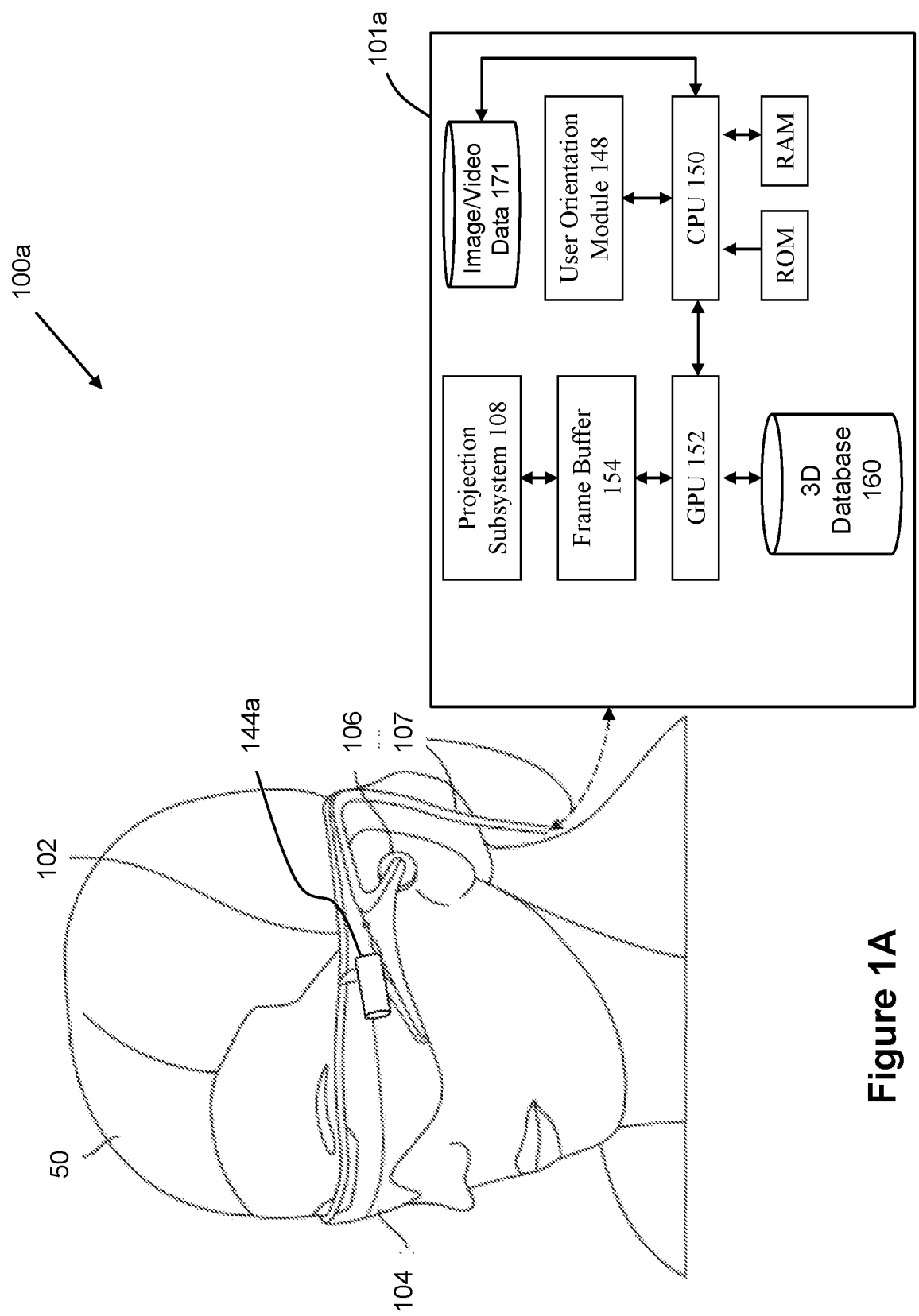
FIGS. 1A-C are block diagrams of illustrative augmented reality systems constructed, according to some embodiments of the present disclosure.

FIG. 1A is a block diagram illustrating an augmented reality (AR) system 100a, according to one embodiment. The AR system 100a may be operated in conjunction with an augmented reality control system 101a, providing images of virtual objects intermixed with physical objects in a field of view of an end user 50. This approach employs one or more at least partially transparent surfaces through which the ambient environment in the field of view of the end user 50 can be seen and on to which the AR system 100a produces images of virtual objects.

For AR applications, it may be desirable to spatially position various virtual objects relative to physical objects in the field of view of the end user 50. Virtual objects, also referred to herein as virtual tags or tag or call outs, may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 100a includes a frame structure 102 worn by the end user 50, a display system 104 carried by the frame structure 102, such that the display system 104 is positioned in front of eyes of the end user 50, and a speaker 106 incorporated into or connected to the display system 104. In the illustrated embodiment, the speaker 106 is carried by the frame structure 102, such that the speaker 106 is positioned adjacent (in or around) an ear canal of the end user 50 (e.g., an earbud or headphone).

The display system 104 is designed to present the eyes of the end user 50 with photo-based radiation patterns that can be comfortably perceived as augmentations to physical reality with both two-dimensional and three-dimensional content. The display system 104 presents a sequence of frames at high frequency that provides the perception of a single coherent scene. To this end, the display subsystem 104 includes a projection subsystem 108 and a partially transparent display screen on which the projection subsystem 108 projects images. The display screen is positioned in the field of view of the end user 50 between the eyes of the end user 50 and an ambient (e.g., physical) environment.

In some embodiments, the projection subsystem 108 takes the form of a scan-based projection device and the display screen takes the form of a waveguide-based display into which the scanned light from the projection subsystem 108 is injected to produce images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within a cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer). The display system 104 may be monocular or binocular. The scanning assembly includes one or more light sources that produce the light beam (e.g., emits light of different colors in defined patterns). The light source may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in the center of the optical waveguide input apparatus, thereby allowing the size of the optical waveguide input apparatus to be minimized. Thus, the display system 104 generates a series of synthetic image frames of pixel information that present an undistorted image of one or more virtual objects to the user. Further details describing display systems are provided in U.S. Provisional Patent Application Ser. No. 61/801,219, filed on Mar. 15, 2013, entitled "Display Subsystem and Method", which has been converted to U.S. Utility patent application Ser. No. 14/212,961, filed on Mar. 14, 2014, and U.S. patent application Ser. No. 14/331,218, entitled "Planar Waveguide Apparatus With Diffraction Element(s) and Subsystem Employing Same" filed on Jul. 14, 2014, all of which are expressly incorporated herein by reference in their entirety.

The AR system 100a further includes one or more sensors mounted to the frame structure 102 for detecting position and movement of a head of the end user 50 and/or eye position and inter-ocular distance of the end user 50. Such sensor(s) may include image capture devices (such as camera 144), microphones, inertial measurement units (IMUs), accelerometers, compasses, GPS units, radio devices, and/or gyros. For example, in one embodiment, the AR system 100a includes a head worn transducer subsystem that includes one or more inertial transducers to capture inertial measures indicative of movement of the head of the end user 50. Such devices may be used to sense, measure, or collect information about the head movements of the end user 50. For instance, these devices may be used to detect measurement movements, speeds, acceleration, and/or positions of the head of the end user 50.

The AR system 100a includes one or more forward facing cameras 144a (hereinafter referred to as "camera 144a"). The camera 144a may be employed for any number of purposes, such as recording of images/video from the forward direction of the AR system 100a. In addition, the camera 144a may be used to capture information about the environment in which the end user 50 is located, such as information indicative of distance, orientation, and/or angular position of the end user 50 with respect to that environment and specific objects in that environment.

Figure 1B:
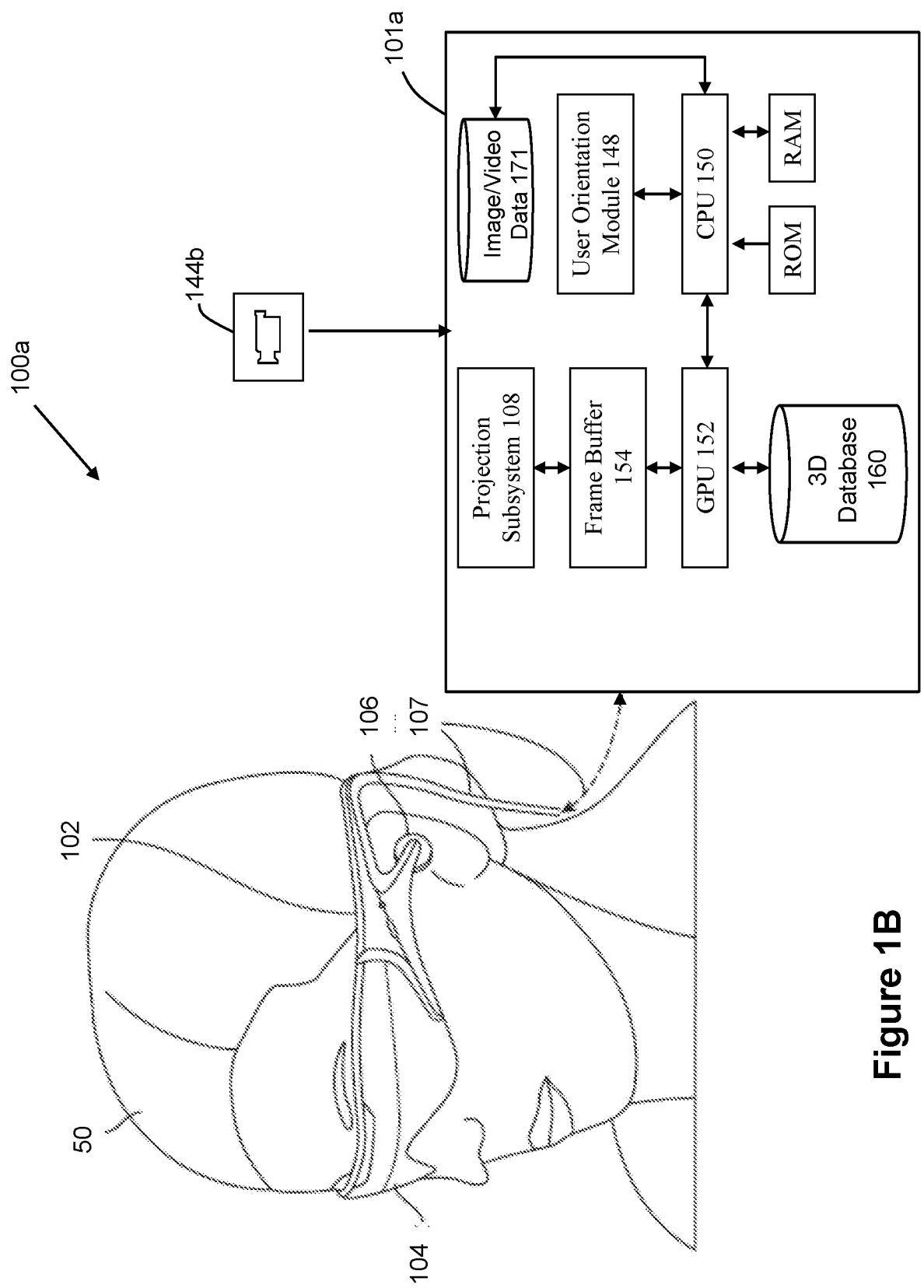

In some embodiments, for example as illustrated in FIG. 1A, the camera 144 may be physically attached to the frame structure 102, and in other embodiments, for example as illustrated in FIG. 1B, camera 144b may be physically remote from the frame structure 102. For example, the camera 144b may be placed at wall or ceiling locations having a clear view of the room that the user is located in, where the camera 144b is placed at known coordinate locations within the room. Any type of camera 144 (camera 144 collectively referring to camera 144a, 144b, or any other suitable type of image acquisition device) may be used to perform AR recording according to the present embodiments.

The AR system 100a may further include rearward facing cameras to track angular position (the direction in which the eye or eyes are pointing), blinking, and depth of focus (by detecting eye convergence) of the eyes of the end user 50. Such eye tracking information may, for example, be discerned by projecting light at the end user's eyes, and detecting the return or reflection of at least some of that projected light.

The augmented reality system 100a further include a control subsystem 101a that may take any of a large variety of forms. The control subsystem 101a includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem may include a digital signal processor (DSP), a central processing unit (CPU) 150, a graphics processing unit (GPU) 152, and one or more frame buffers 154. Although FIG. 1A illustrates one frame buffer 154, the control subsystem 101a may include more than one frame buffer 154. The control subsystem 101 may be communicatively coupled to the frame structure 102, for example, via a wired or wireless connection.

The CPU 150 controls overall operation of the AR system 100a. The CPU 150 may read from read only memory (ROM) and write into and/or reads out of random access memory (RAM).

The GPU 152 renders frames (e.g., translating a three-dimensional scene into a two-dimensional image) and stores these frames in the frame buffer(s) 154. While not illustrated, one or more additional integrated circuits may control the writing into and/or reading out of frames from the frame buffer(s) 154 and operation of the scanning device of the display subsystem 104. Reading into and/or out of the frame buffer 154 may employ dynamic addressing, for instance, where frames are over-rendered. The GPU 152 may accesses three dimensional (3D) data of one or more scenes for rendering frames, as well as synthetic sound data associated with virtual sound sources contained within the 3D scenes from a 3D database 160.

The augmented reality system 100a further includes a user orientation detection module 148. The user orientation module 148 detects the instantaneous position of a head of the end user 50 and may predict the position of the head of the end user 50 based on position data received from the sensor(s). The user orientation module 148 also tracks eyes of the end user 50, and in particular the direction and/or distance at which the end user 50 is focused based on the tracking data received from the sensor(s).

The various components of the AR system 100a may be physically contained in a distributed subsystem. For example, the AR system 100a includes a local processing and data module operatively coupled, such as by a wired lead or wireless connectivity, to a portion of the display subsystem 104. The local processing and data module may be mounted in a variety of configurations, such as fixedly attached to the frame structure 102, fixedly attached to a helmet or hat, embedded in headphones, removably attached to a torso of the end user 50, or removably attached to a hip of the end user 50 in a belt-coupling style configuration. The AR system 100a further includes a remote processing module and remote data repository operatively coupled, such as by a wired lead or wireless connectivity to the local processing and data module, such that these remote modules are operatively coupled to each other and available as resources to the local processing and data module. The local processing and data module may comprise a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display subsystem 104 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Figure 1C:
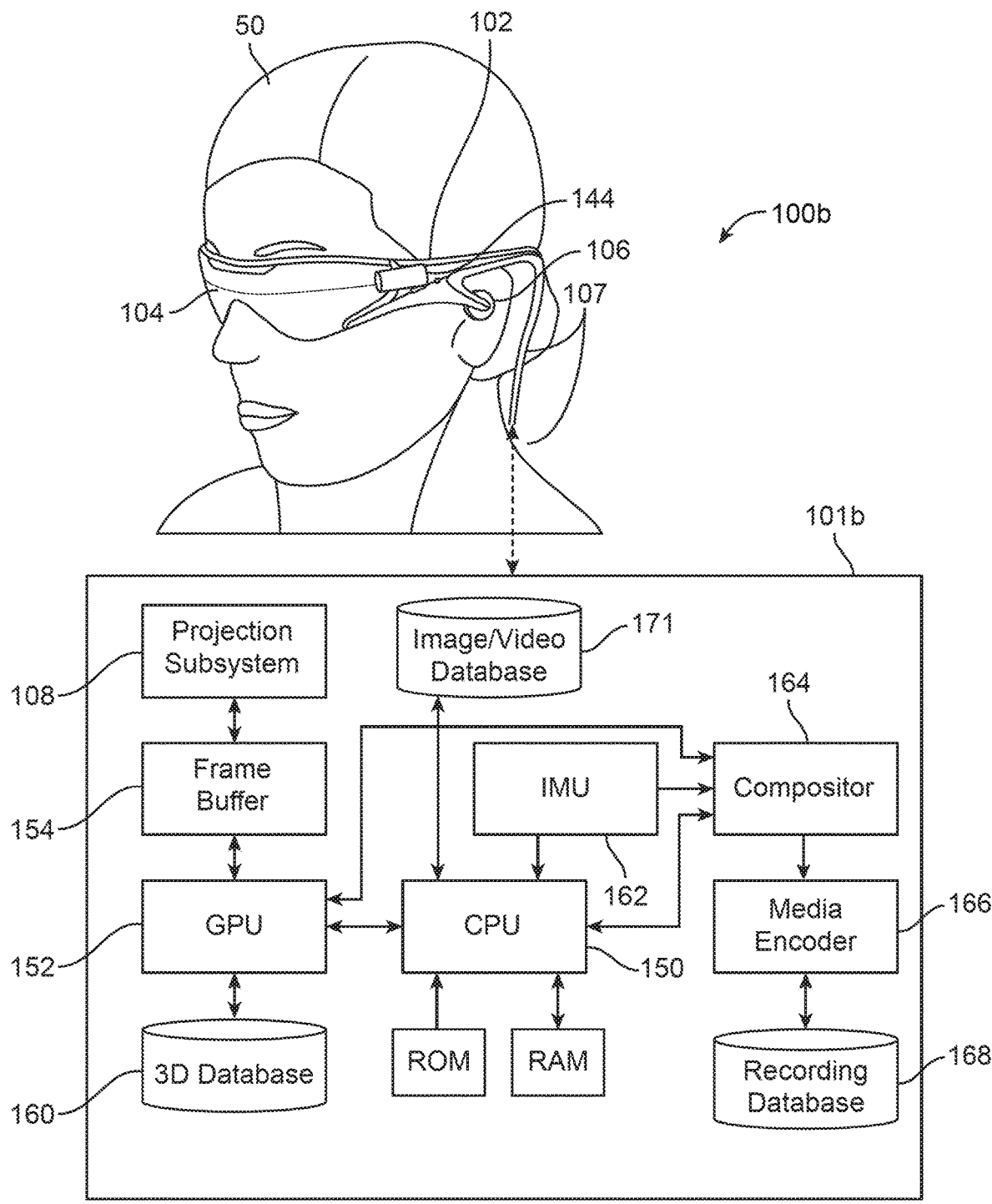

FIG. 1C is a block diagram illustrating an augmented reality (AR) system 100b, according to one embodiment. The AR system 100b has a control subsystem 101b. As was previously described above with respect to the control subsystem 101a, the control system 101b also includes a projection subsystem 108, one or more frame buffers 154, a GPU 152, 3D database(s) 160, image/video data 171, and CPU 150. The control subsystem 101b further includes one or more inertial measurement unit (IMU) 162, a compositor 164, a media encoder 166, and recording database 168.

The projection subsystem 108 provides images of virtual objects intermixed with physical objects in a field of view of the end user 50, where the images may be stored in one or more frame buffers 154.

The IMU 162 corresponds to a sensor/measurement apparatus that identifies pose data for the AR system, including for example, pose data corresponding to six degrees of freedom having three degrees pertaining to a gyroscope and three degrees pertaining to an accelerometer. The IMU 162 detects an instantaneous position of the head of the end user 50. The IMU 162 may detect the instantaneous position of the head of the end user 50 based on a known relationship between the head of the end user 50 and the frame structure 102 on which the IMU 162 may reside. In some embodiments, the IMU 162 may predict a position of the head of the end user 50 based on previously detected positions of the head of the end user 50. The IMU 162 may also track the eyes of the end user 50, and in particular a direction and/or distance at which the end user 50 is focused on. The IMU 162 further detects instantaneous position of the camera 144. In some embodiments, the IMU 162 extrapolates an instantaneous position of the camera 144 from the detected instantaneous position based on a known offset between the camera 144 and the frame structure 102.

In some embodiments, instead of re-using rendered virtual content from a perspective of the user's eyes for AR recordings, virtual content is instead rendered from a perspective of the camera. That virtual content that is rendered is combined with the camera recording to form the AR recording. The CPU 150 controls the operation of the control subsystem 101b such that the GPU 152 will render virtual content from the perspective of the camera 144 (using pose data for the camera 144 that was generated by the IMU 162).

The compositor 164 combines rendered virtual content with the camera recording content. The compositor 164 operates by superimposing the rendered virtual content from the GPU 152 with the recorded content from the camera 144b, according to the correct relative positioning of the real content in the camera's image frame that is lined up properly in the appropriate coordinate space with the rendered virtual content from the GPU 152.

The media encoder 166 takes the output data from the compositor 164, and generates one or more image frame(s) into the desired media format type. The image frames may be generated as a single image screenshot and/or a stream/sequence of image frames to form a video file. The encoded media data is then stored within the recording database 168.

AR Recording

The description that follows pertains to an approach for generating AR recordings, according to some embodiments. Instead of re-using rendered virtual content from a perspective of a user's eyes for AR recordings, additional virtual content is rendered from a perspective of a camera, and that additional virtual content is combined with a camera recording to form an AR recording.

Users of AR systems often seek to preserve a recording of their AR experience, where the recording includes both real world objects and virtual object (or content) produced by the AR system. A problem that arises is that image artifacts may be created due to the fact that the virtual objects are rendered from the perspective of the user's eyes, whereas the camera is recording the real objects from the perspective of the camera which is different from the perspective of the user's eyes.

Figure 2:
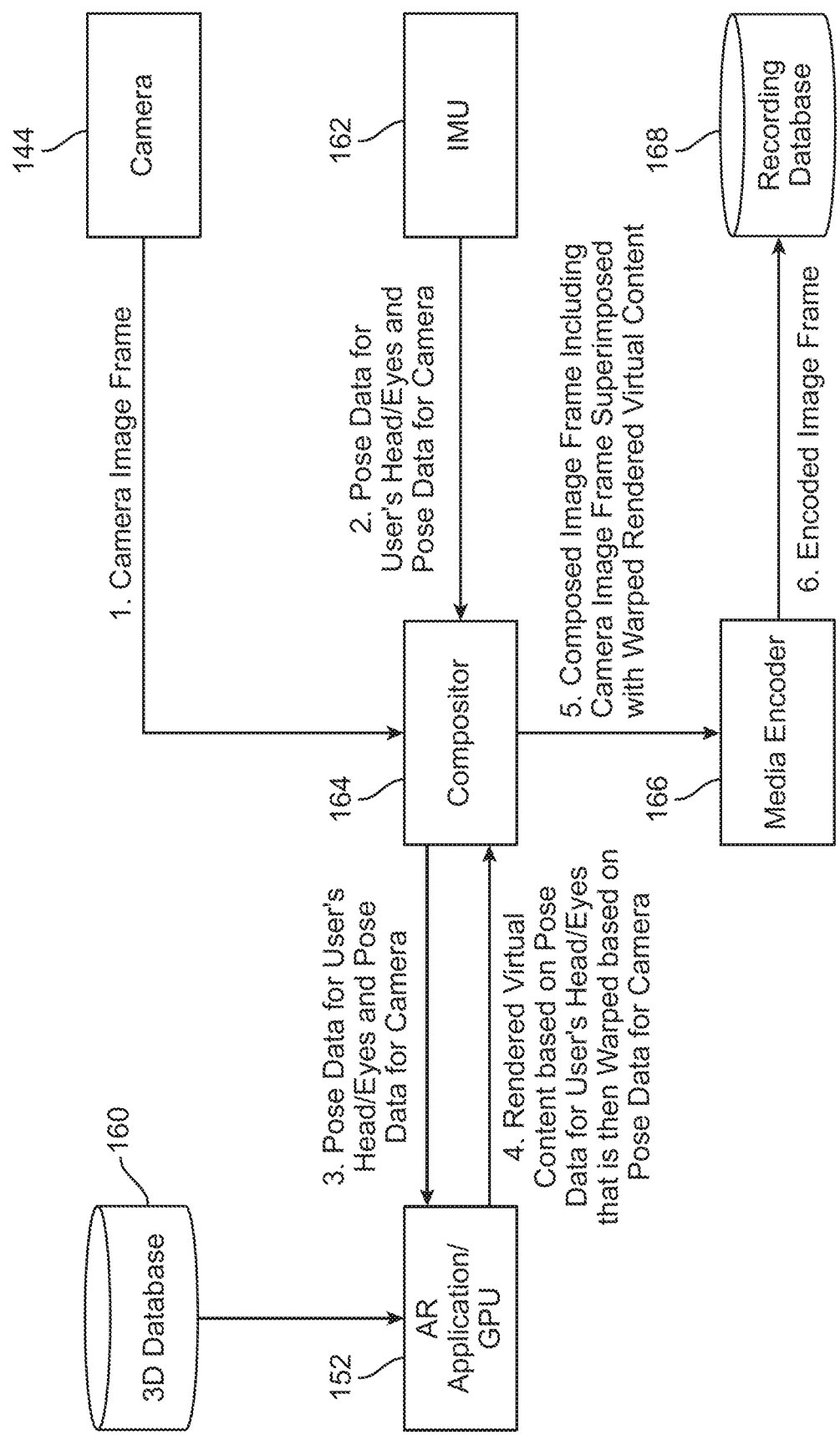
FIG. 2 illustrates an example architecture for implementing the AR recording process according to some embodiments.

FIG. 2 illustrates an example architecture for implementing an AR recording process using warping, according to some embodiments. In some embodiments, the warping process may result in image artifacts. At a given point in time, a request will be received to generate virtual image data for display on an AR device. At (1), the camera 144 captures a camera image frame and transmits the captured camera image frame to the compositor 164. In some embodiments, the camera 144 may be attached to the frame structure 102. In some embodiments, the camera 144 may be mounted at a determined location and orientation within the environment.

At (2), an IMU 162 captures/identifies pose data for the head and/or the eyes of the end user 50 and captures pose data for the camera 144 and transmits the captured pose data to the compositor 164. In some embodiments, the IMU 162 captures/identifies pose data for the AR system, generally to determine the pose of the user's eyes or head, as well as the camera. As used herein, the term "pose" includes, for example, (X, Y, Z) coordinate locations as well as an angular direction/location/orientation. In some embodiments in which the camera 144 is physically attached to the frame structure 102, the pose data for the camera 144 may be extrapolated based upon a known and fixed offset between the camera 144 and the frame structure 102. In some embodiments in which the camera 144 is physically remote from the frame structure 102, the pose data for the camera 144 can include fixed location/orientation data that is pre-designated, for example, within a system coordinate space.

At (3), the compositor 164 sends the pose data for the head and/or eyes of the end user 50 and the pose data for the camera 144 to the GPU 152. The GPU 152 generates and renders virtual content based on the pose data for the head and/or the eyes of the end user 50. In some embodiments, this rendering action generates the virtual content so that an image of the virtual content is generated from the perspective of the head and/or the eyes of the end user 50. A 3D database 160 is employed to provide information about the virtual objects in the environment (such as information about shape, size, surface, texture, location, orientation, etc.) as well as configuration information for performing rendering operations upon those shapes. Virtual objects that are visible from the perspective of the head and/or the eyes of the end user 50 are then rendered as an image from the perspective of the head and/or the eyes of the end user 50.

In some embodiments, with regards to the AR recording process, the compositor engine 164 makes a request to the AR application/GPU 152 to generate virtual content suitable for an AR recording. In particular, at (4) the previously generated virtual content is warped to attempt to modify the virtual content from the perspective of the camera 144 and that warped virtual content is then sent to the compositor 164.

The problem is that the warped virtual content may not provide an accurate enough view of the virtual content from the perspective of the camera. For example, this may occur where a virtual content based on the perspective of the head and/or the eyes of the end user 50 fails to include displayable information about the virtual content that would be visible from the perspective of the camera 144.

The compositor 164 composes an image frame by superimposing the camera image frame captured by the camera 144 and the warped rendered virtual content generated by the GPU 152. At (5), the compositor 164 send the composed image frame to the media encoder 166. The media encoder 166 encodes the composed frame. At (6), the media encoder sends the encoded image frame to the recording database 168. When the compositor 164 sends the composed image frame having both the warped rendered virtual content and the camera image frame to the media encoder 166, the media encoder 166 may generate an encoded image frame that includes video artifacts that affect content veracity of recorded image/video frames. At (6), that encoded image frame having the visible video artifacts may then be recorded into the recording database 168.

Figure 3:
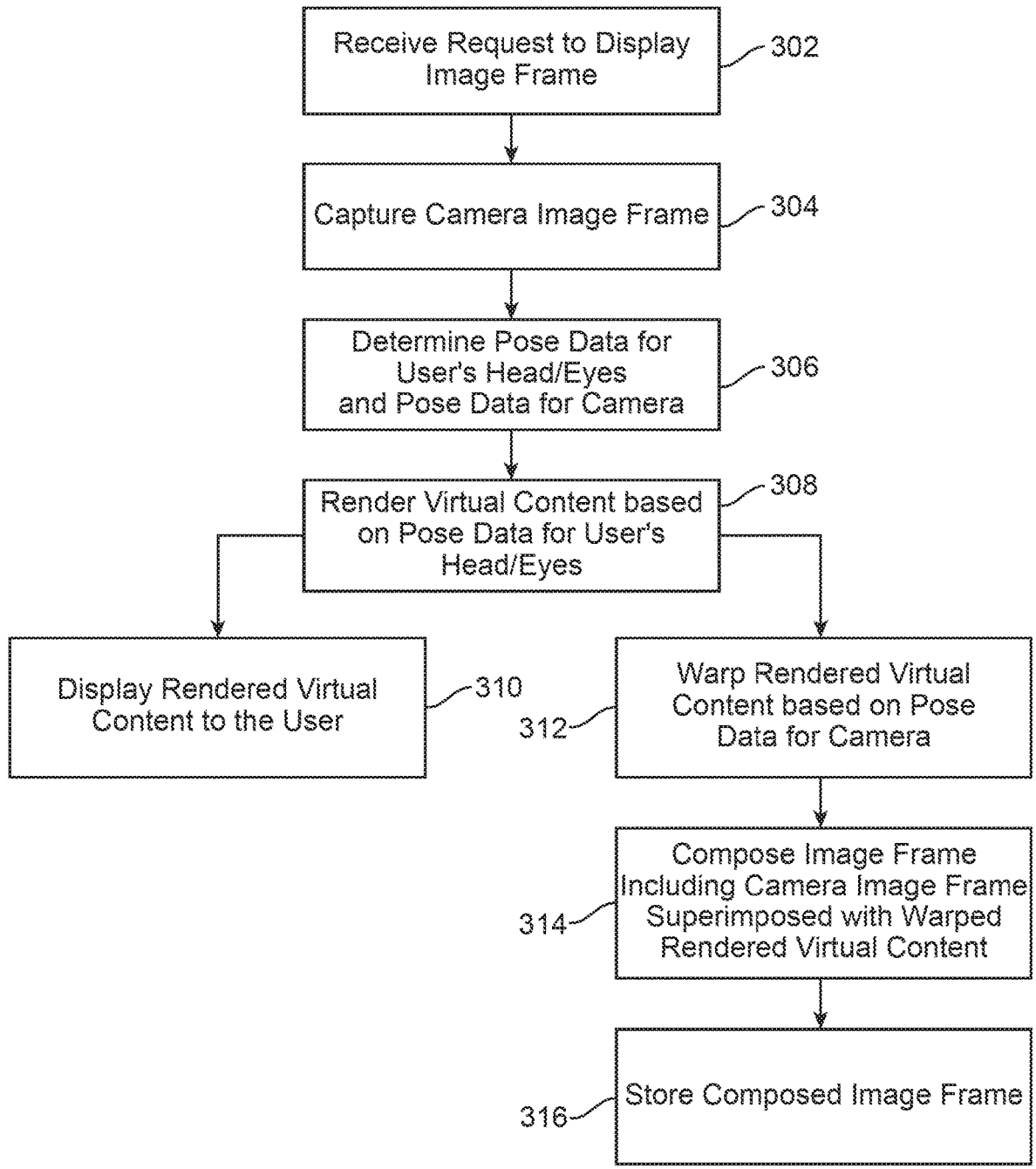
FIG. 3 shows a flowchart of an approach to generate AR recordings using warping, according to some embodiments.

FIG. 3 shows a flowchart of this approach to generate AR recordings, according to some embodiments. At 302, a request is received to display an image. The request may originate, for example, based upon a request to generate a new image frame to display to the end user 50.

At 304, the camera 144 captures a camera image frame. The camera image frame is recorded by capturing a frame of image data from the perspective of the camera 144. The captured camera image frame may then be stored in a computer readable medium. At 306, the IMU 162 determines pose data for the head and/or the eyes of the end user 50 and pose data for the camera 144. In some embodiments in which the camera 144 is physically attached to the frame structure 102, the pose data for the camera 144 may be extrapolated based upon a known and fixed offset between the camera 144 and the frame structure 102. In some embodiments in which the camera 144 is physically remote from the frame structure 102, the pose data for the camera 144 can include fixed location/orientation data that is pre-designated, for example, within a system coordinate space.

At 308, the GPU 152 renders virtual content solely from the perspective of the user's eyes. That is, the GPU 152 renders virtual content based on the pose data for the head and/or the eyes of the end user 50. At 310, the projection subsystem 108 displays the virtual content that is rendered from the perspective of the head and/or the eyes of the end user 50.

At 312, the GPU 152 warps the rendered virtual content based on the pose data for the camera 144. At 314, the compositor 164 composes an image frame by superimposing the camera image frame and the warped rendered virtual content. At 316, the media encoder 166 stores an encoded version of the composed image frame in the recording database 168, where the recording database 168 may correspond to a computer readable medium. The combined AR image composed image frame may include individual frames of image data, or may be saved as a stream of image frames to form a video recording.

Figure 4B:
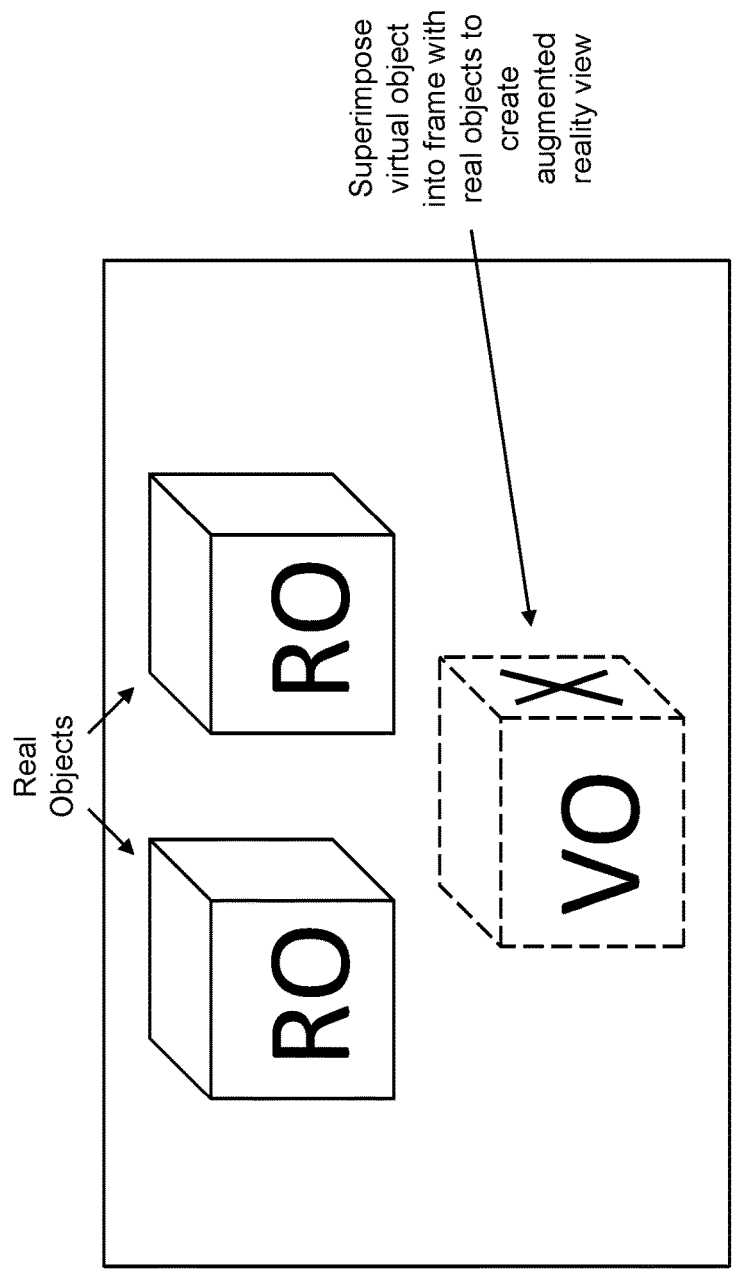

FIGS. 4A-G provide an illustration of this, according to some embodiments. FIG. 4A shows two real world objects that exist in an environment of a user (e.g., the end user 50). Each of these real objects are shaped as a regular block/cube, with the letters "RO" on a front face of the real objects. As shown in FIG. 4B, assume that a virtual world implemented by an AR system (e.g., the AR system 100a or 100b) includes a virtual object at a certain relative distance from the two real objects (e.g., at a location beneath the two virtual objects). The virtual object does not actually exist in the real world and hence cannot be viewed by the end user 50 without the AR system 100a or 100b or viewed within image frames captured by a camera (e.g., the camera 144) or viewed by the user without an AR system. However, the virtual object has a defined shape and coordinate location, and can therefore be rendered by the AR system 100a or 100b as virtual content to be displayed to the user at its logical location and orientation. The virtual object is shaped as a regular block/cube, with the letters "VO" on its front face and the letter "X" on a side face.

Figure 4C:
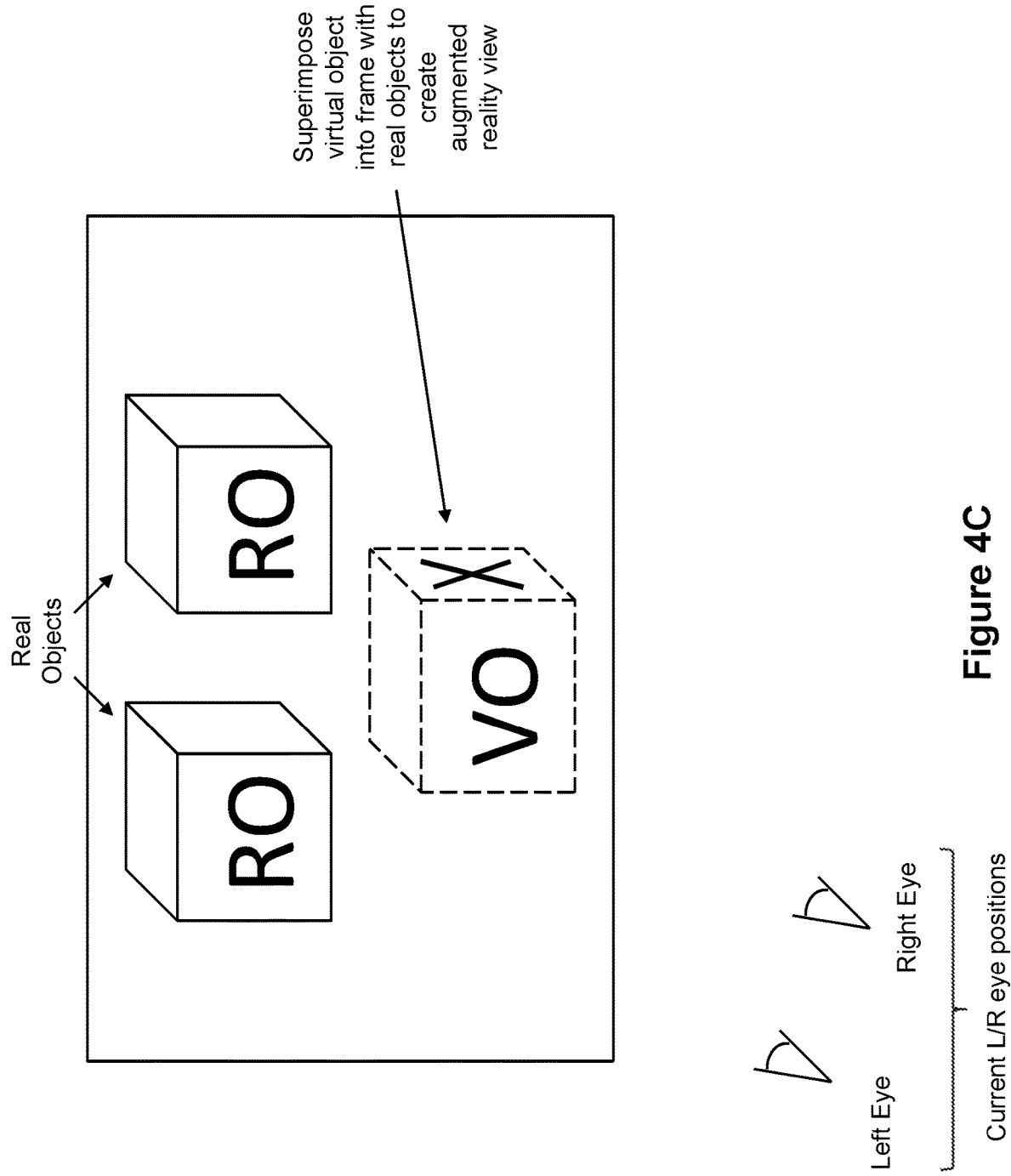

Assume that eyes of the end user 50 are located with the location and angular position shown in FIG. 4C. In this example situation, the eyes of the end user 50 are looking at the real objects and the logical location of the virtual object from a perspective (e.g., a first perspective) that is directly at the front face of the real objects. From this perspective, as shown in FIG. 4D, a GPU (e.g., the GPU 152) will therefore render the image of the virtual object as if the eyes of the end user 50 are looking directly at the front face of the virtual object. This means that even though the virtual object has the letters "VO" on the front face and the letter "X" on a side face, the virtual object will be rendered showing only the front face of the virtual object with the letters "VO"— without any part of the side face of the virtual object having the letter "X" being rendered. Thus, the combination of the real object and the rendered virtual object will show all of these real/virtual objects from the first perspective—looking at just the front face of these real/virtual objects.

Figure 4E:
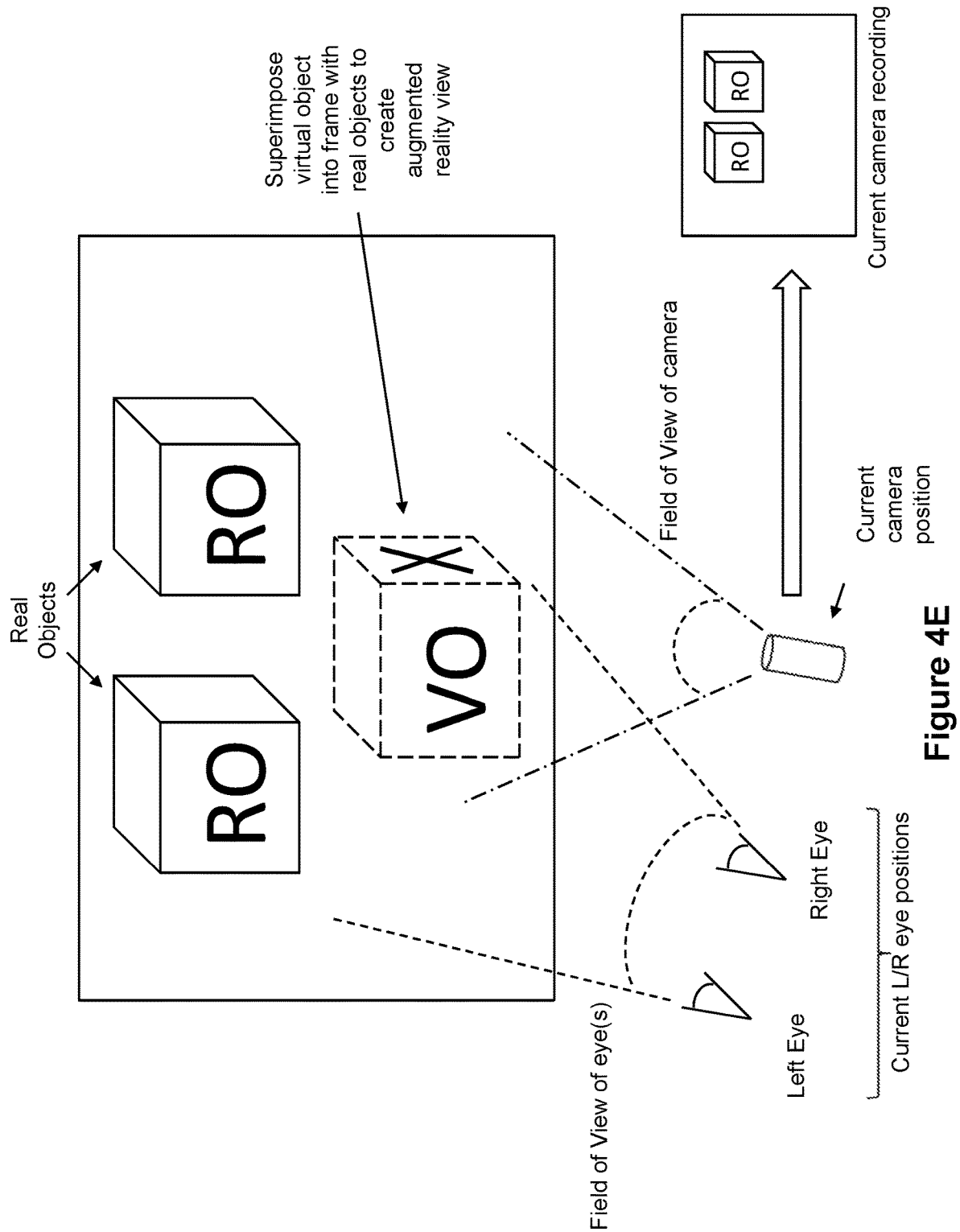

However, as shown in FIG. 4E, a current location and rotational position of a camera (e.g., the camera 144) is at a different perspective (e.g., a second perspective) from that of the eyes of the end user 50. In this situation, the perspective of the camera 144 is offset at a certain distance rightwards from the perspective of the eyes of the end user 50, and is angled to face both the front and right sides of the real objects. This means that the camera 144 will record image frames that capture both the front and right-side faces of the real objects.

Figure 4F:
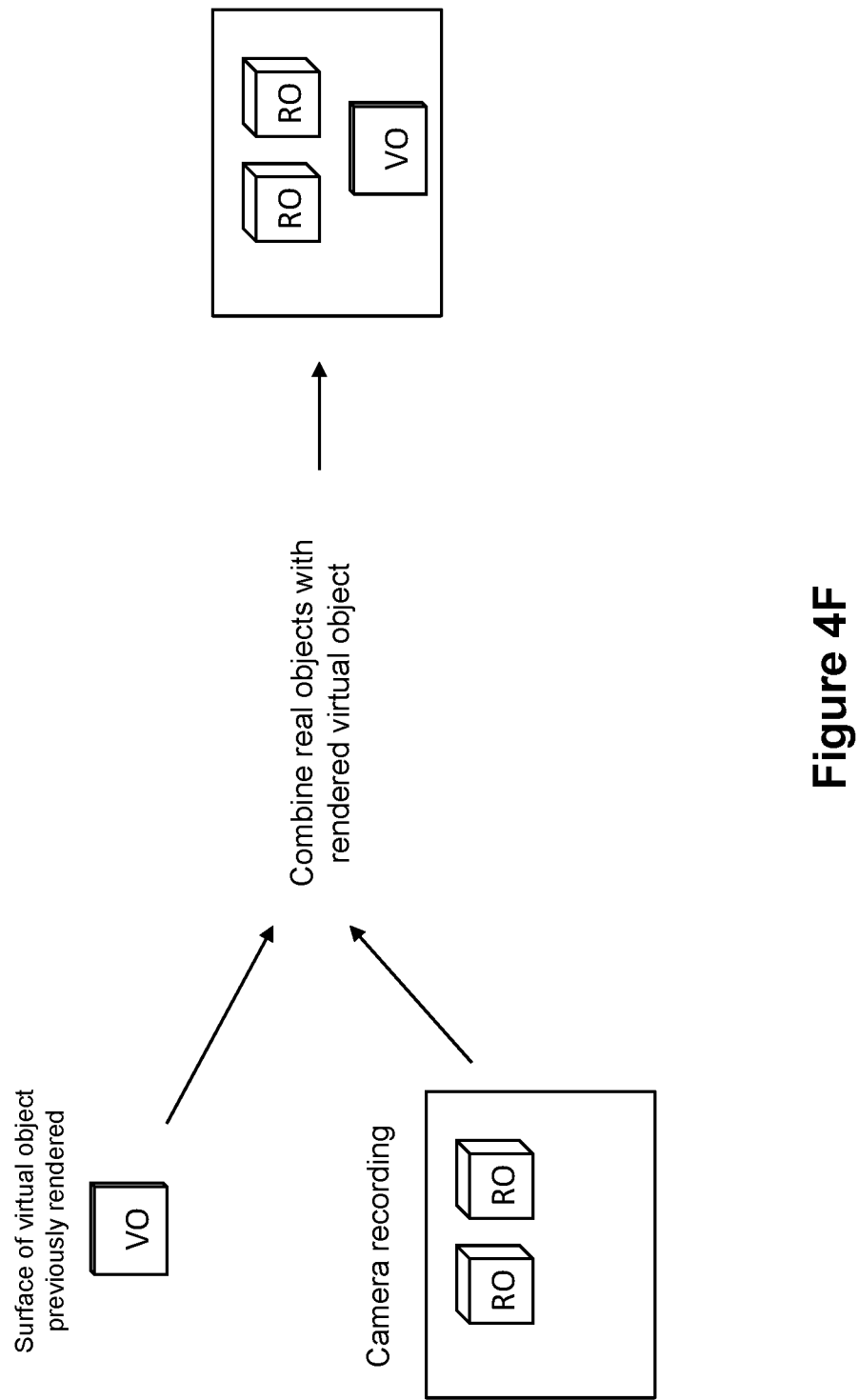

As illustrated in FIG. 4F, directly taking the rendered image of the virtual object from the first perspective and superimposing it with the captured image of the real objects from the second perspective causes a mismatch in the perspective views of these objects. In particular, while both the front and partial right-side faces of the real objects are shown from the second perspective, only the front face of the virtual object is shown from the first perspective. This means that a recording which simply combines the rendered virtual objects with the recording of the real objects will show the real objects from the first perspective and the virtual objects from the second perspective—potentially creating a significant disconnect in the orientation of objects in the final image product for a given image frame of the recording.

Figure 4G:
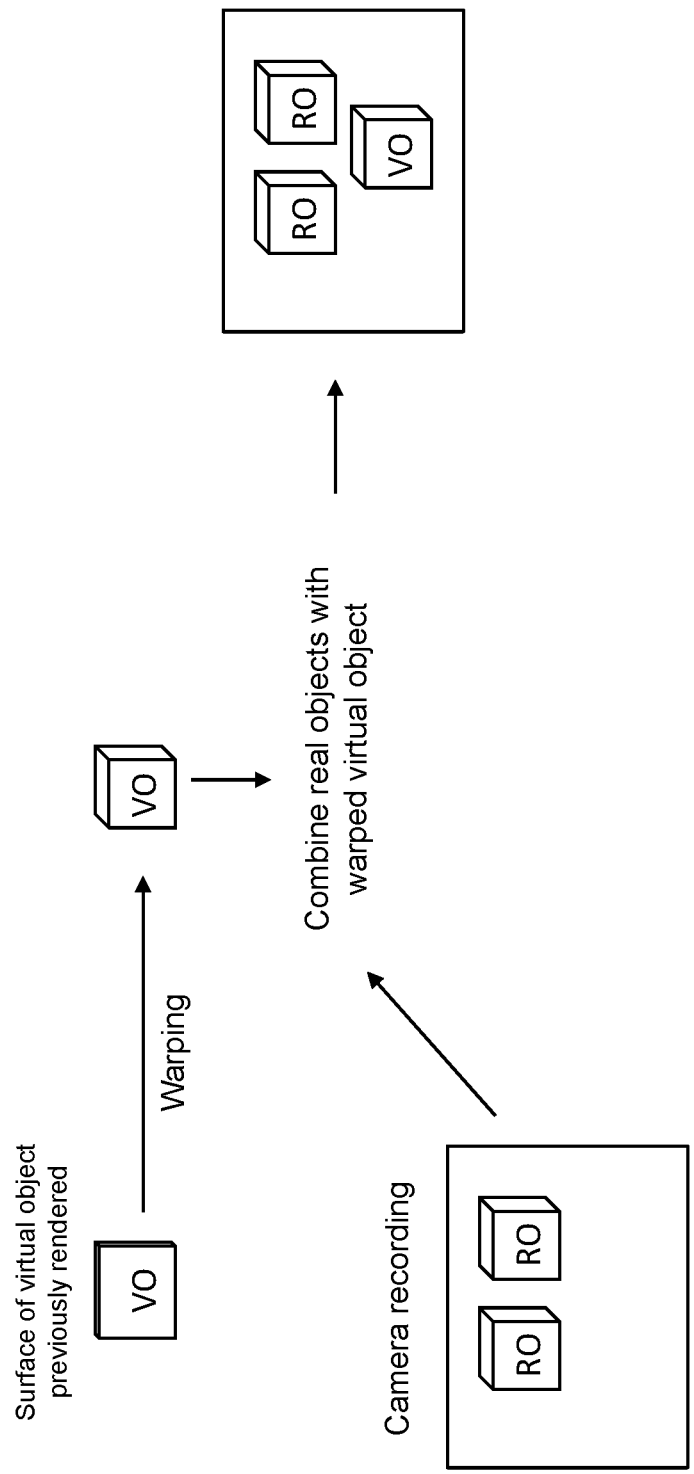

As shown in FIG. 4G, warping may be employed to change the rendered image of the virtual object so that it is shown from the proper perspective (e.g., from the first perspective to the second perspective). This approach takes the rendered image of the virtual object, and shifts the way that the surface of the rendered image of the virtual object is presented to attempt to display those virtual objects from the second perspective. One problem with this approach is that when a virtual object is originally rendered from the first perspective, the rendered virtual object may not include displayable information about the virtual object from the second perspective. Here, the virtual object was rendered from the first perspective from which only the front face of the virtual object is visible, which means the content from the other sides of the virtual object was not rendered. Therefore, even if warping is applied, the letter "X" from the right-side face of the virtual object will not exist in the warped virtual object because the letter "X" was not in the rendered virtual object from the first perspective. This means that the combination of the warped virtual object from the first perspective and the real objects from the second perspective is missing content that should have been viewable from the second perspective (i.e., the "X" on the right-side of the virtual object) since the camera 144 has a different viewing perspective from the eyes of the end user 50 (e.g., the first perspective). This creates video artifacts that affect the usability and accuracy of the recorded image/video frames.

Figure 5:
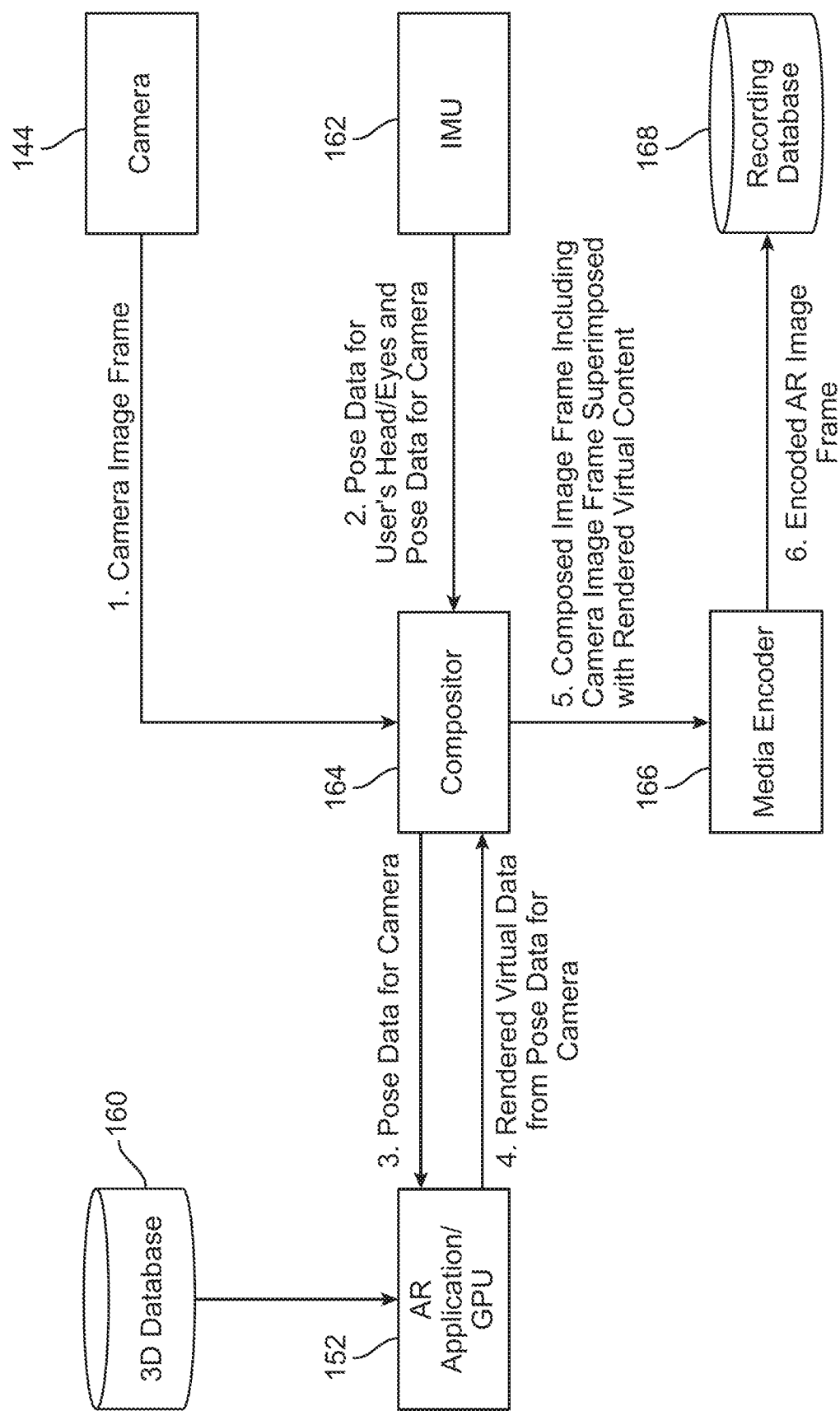
FIG. 5 illustrates an architecture for implementing this AR recording process, according to some embodiments.

FIG. 5 illustrates an architecture for implementing this AR recording process, according to some embodiments. A request is received by the AR system 100a or 100b to generate virtual image data for display.

At (1), the camera 144 captures a camera image frame and transmits the captured camera image frame to the compositor 164. As described above, in some embodiments the camera 144 may be attached to the frame structure 102. In some embodiments, the camera 144 may be mounted at a known location and orientation within the environment.

At (2), the IMU 162 captures pose data for the head and/or the eyes of the end user 50 and captures pose data for the camera 144 and transmits the captured pose data to the compositor 164. In some embodiments in which the camera 144 is physically attached to the frame structure 102, the pose data for the camera 144 may be extrapolated based upon a known and fixed offset between the camera 144 and the frame structure 102. In some embodiments in which the camera 144 is physically remote from the frame structure 102, the pose data for the camera 144 can include fixed location/orientation data that is pre-designated, for example, within a system coordinate space.

In some embodiments, with regards to the AR recording process, the compositor 164 makes a request to the AR application/GPU 152 to generate virtual content suitable for the AR recording. The request from the compositor engine 164 to the application/GPU 152 includes the pose data for the camera 144. That is, at (3), the compositor 164 sends the pose data for the camera 144 to the AR application/GPU 152.

The AR application/GPU 152 generates and renders virtual content based on the pose data for the camera 144. In some embodiments, this rendering action generates the virtual content so that an image of the virtual content is generated from the perspective of the camera 144. A 3D database 160 is employed to provide information about the virtual objects in the environment (such as information about shape, size, surface, texture, location, orientation, etc.) as well as configuration information for performing rendering operations upon those shapes. Virtual objects that are visible from the perspective of the camera 144 are then rendered as an image from the perspective of the camera 144. As noted in more detail below, the timing of the rendering for this image may be configured to minimize computational latency on the system.

At (4), the AR application/GPU 152 send the rendered virtual content to the compositor 164. The compositor 164 composes an image frame by superimposing the camera image frame captured by the camera 144 and the rendered virtual content generated by the AR application/GPU 152. This operation may be performed by inserting the virtual content at the correct relative positioning with the camera image frame by lining up the content items into their correct positions/locations according to a common coordinate space.

At (5), the compositor 164 sends the composed image frame to the media encoder 166. The media encoder 166 encodes the composed image frame. The composed image frame may be saved as a single image screenshot, or placed into a stream of image frames to form a video file. At (6), the media encoder 166 sends the encoded image frame to the recording database 168, where the recording database 168 may correspond to a computer readable medium.

Figure 6:
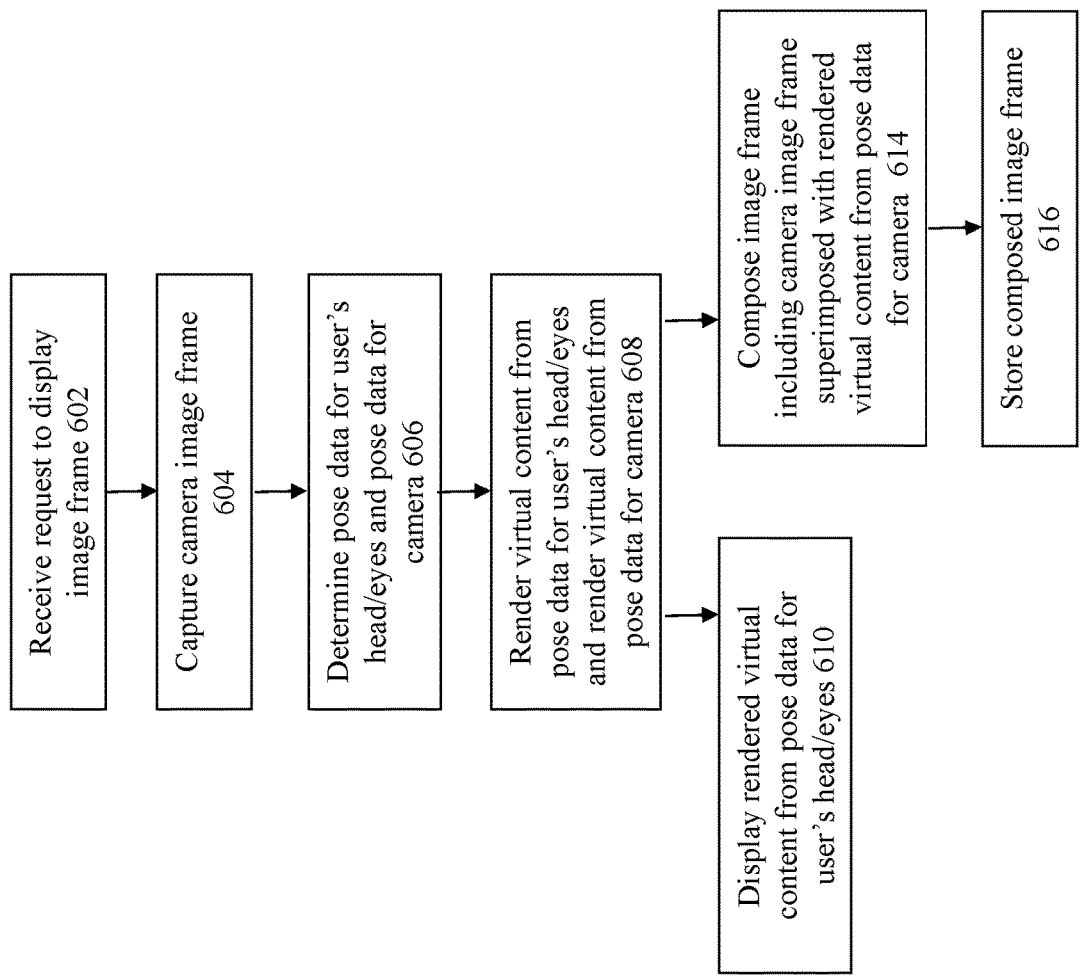
FIG. 6 shows a flowchart of an approach to generate AR recordings, according to some embodiments.

FIG. 6 shows a flowchart of an approach to generate AR recordings, according to some embodiments. At 602, a request is received to display an image. The request may originate, for example, based upon the request to generate a new image frame to display to the end user 50.

At 604, the camera 144 captures an image frame. The camera image frame is recorded by capturing a frame of the image data from the perspective of the camera 144. The captured camera image frame may then be stored in a computer readable medium.

At 606, the IMU 162 determines pose data for the head and/or the eyes of the end user 50 and pose data for the camera 144. The pose data includes pose data for the user's head/eyes, as well as pose data for the camera. In some embodiments in which the camera 144 is physically attached to the frame structure 102, the pose data for the camera 144 may be extrapolated based upon a known and fixed offset between the camera 144 and the frame structure 102. In some embodiments in which the camera 144 is physically remote from the frame structure 102, the pose data for the camera 144 can include fixed location/orientation data that is pre-designated, for example, within a system coordinate space.

At 608, the AR application/GPU 152 renders virtual content based on the pose data for the head and/or the eyes of the end user 50 and renders virtual content based on the pose data for the camera 144. That is, the AR application/GPU 152 renders virtual content twice—once based on the pose data for the head and/or the eyes of the end user 50 and once based on the pose data for the camera 144. This approach does not solely render the virtual content based on the pose data for the head and/or eyes of the end user 50. In some embodiments, the location/angle of the camera is known in relation to the head and/or the eyes of the end user 50, and a transformation from the head and/or eyes of the end user 50 to the camera 144 may be determined and used as a feedback mechanism to the AR application/GPU 152 to generate additional virtual content appropriate for the camera-based view of the virtual content. This means that the additional virtual content will not be rendered from the perspective of the head and/or the eyes of the end user 50, but will instead be rendered from the perspective of the camera 144 (and potentially a perspective that is never actually served to the end user 50 in real time).

At 610, the projection subsystem 108 display the virtual content that is rendered from the perspective of the head and/or the eyes of the end user 50. This means that the virtual content is provided as described above to inject the appropriate light patterns for the virtual content into the display screen (e.g., with light provided to the appropriate layers of a waveguide-based display) to produce the image of the virtual content for the end user 50 that is superimposed onto the view of the real objects in the environment from the perspective of the end user 50.

At 614, the compositor 164 composes an image frame by superimposing the camera image frame and the rendered virtual content, where the rendered virtual content is the virtual content rendered by the AR application/GPU 152 based on the pose data for the camera 144. In some embodiments, this action essentially projects the rendered virtual content into the coordinate space of the camera image frame to generate a combined image having both the real objects and the virtual objects.

At 616, the media encoder 166 stores an encoded version of the composed image frame in the recording database 168, where the recording database 168 may correspond to a computer readable medium. The composed image frame may include individual frames of image data, or may be saved as a stream of image frames to form a video recording.

Figure 7A:
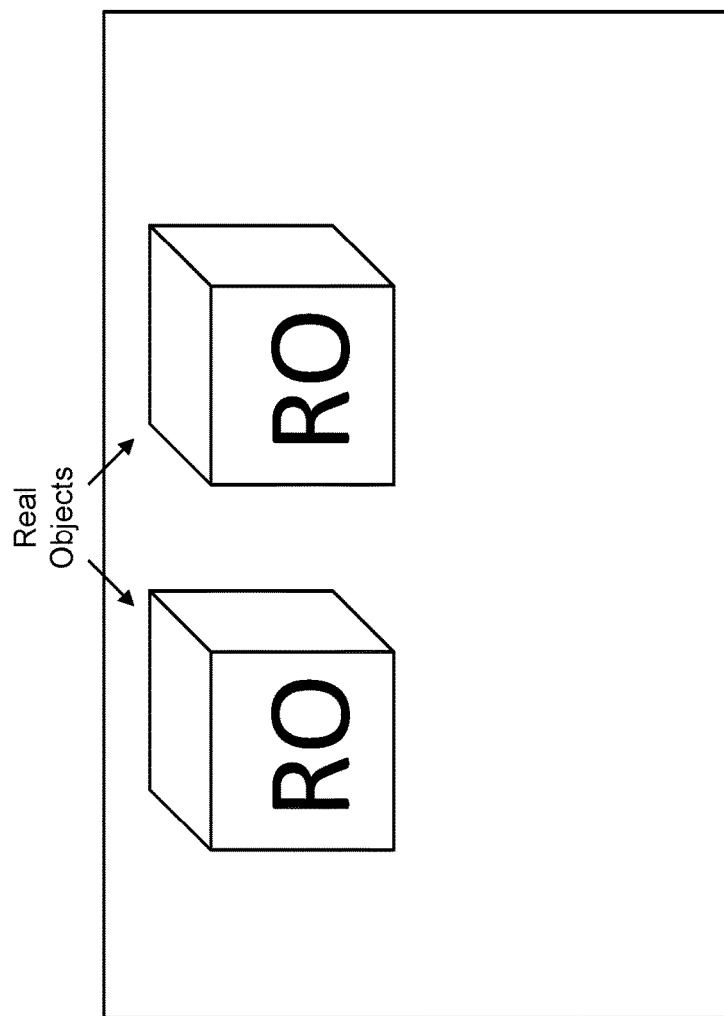
FIGS. 7A-F illustrate an approach to generate AR recordings, according to some embodiments.
Figure 7B:
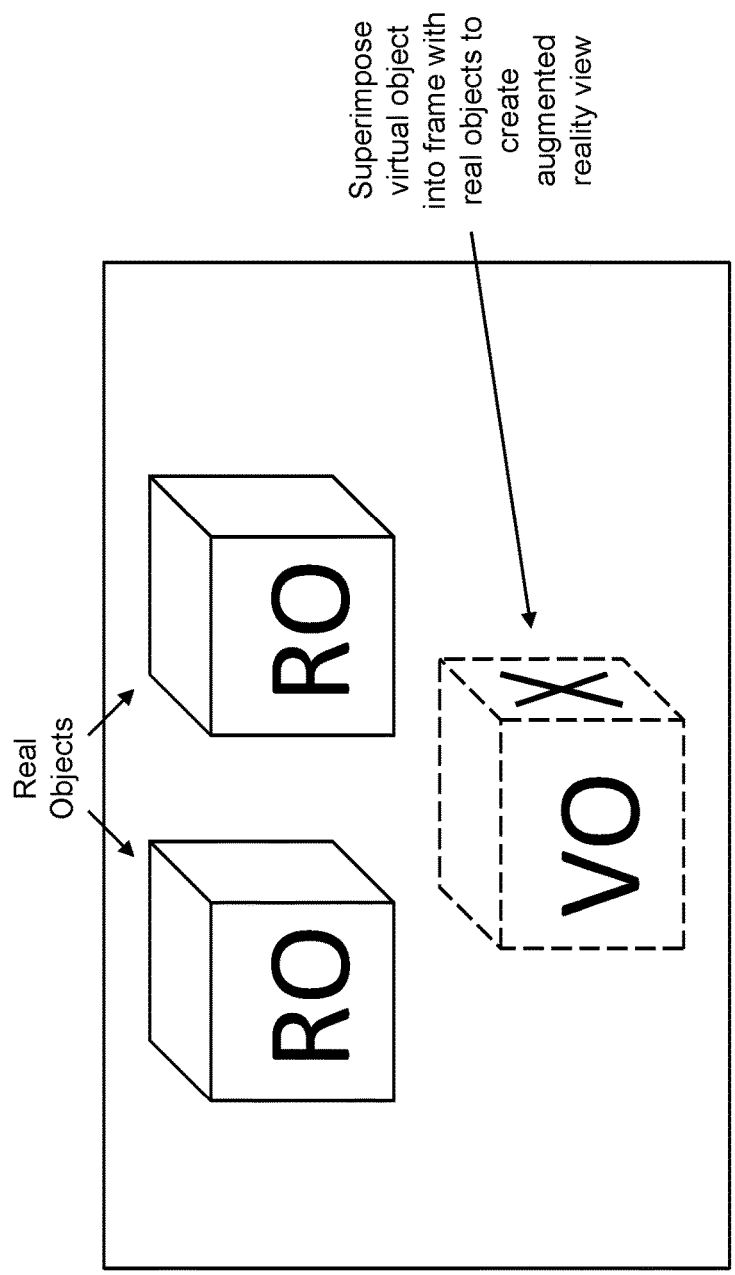
Figure 7C:
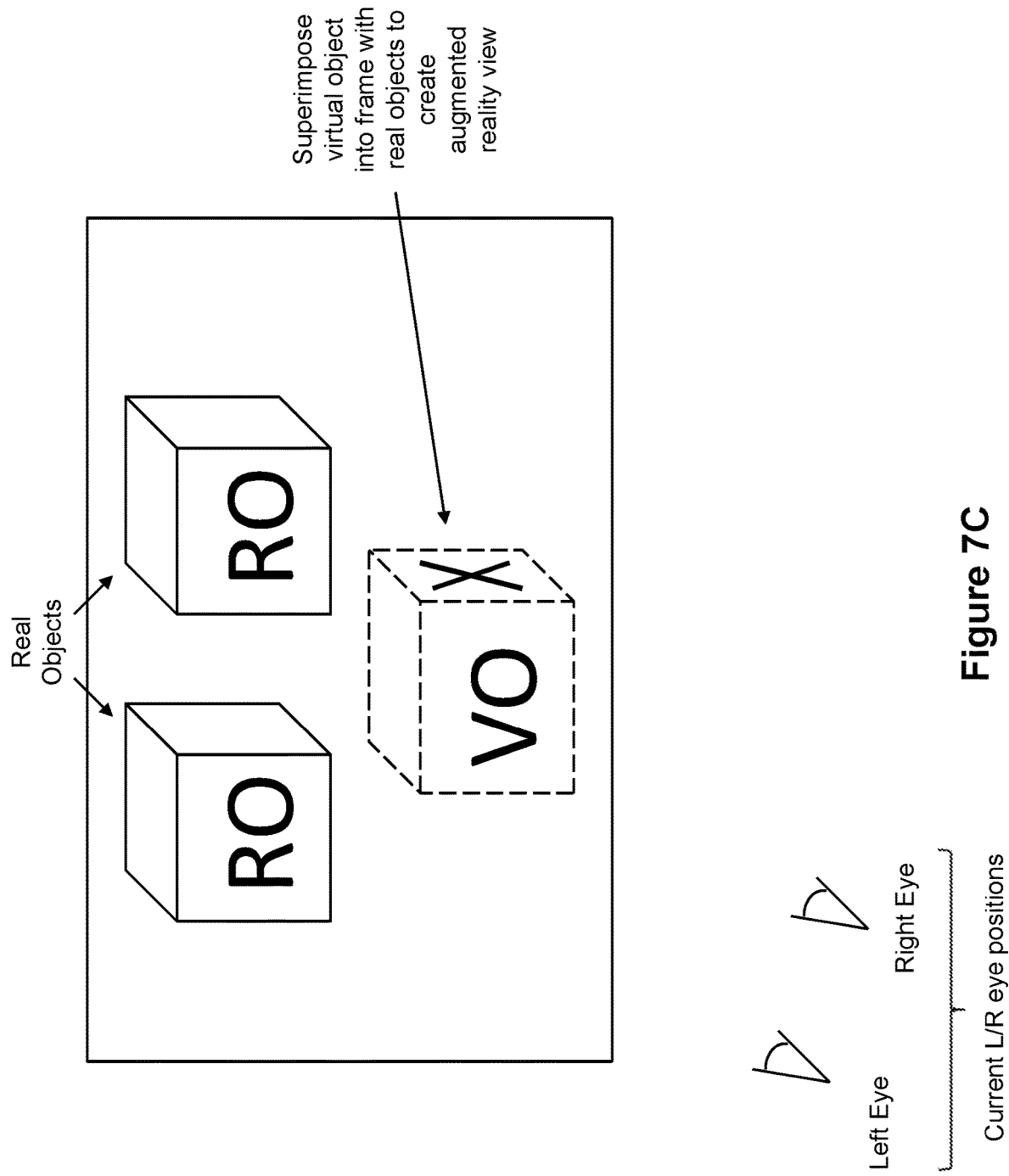
Figure 7D:
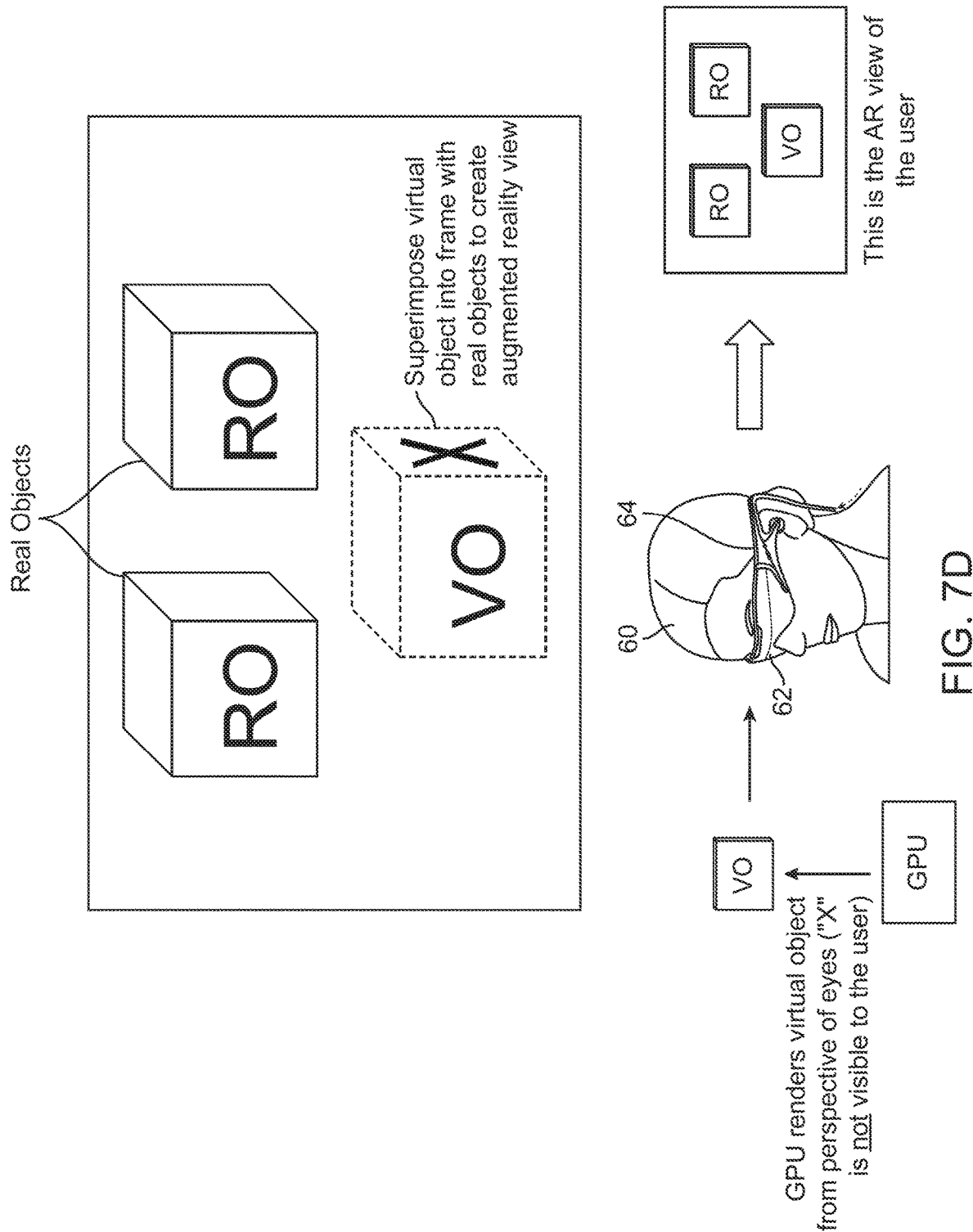

FIGS. 7A-F provide an illustration of this (using may of the same structures previously discussed for FIGS. 4A-G), according to some embodiments. FIG. 7A shows two real world objects that exists in an environment of a user (e.g., the end user 50). Each of these real objects are shaped as a regular block/cube, with the letters "RO" on a front face of the real objects. FIG. 7B shows a virtual object that has been logically placed at a certain distance beneath the two real objects. As before, the virtual object is shaped as a regular block/cube, with the letters "VO" on its front face and the letter "X" on a side face. Assume that the eyes of the end user 50 are located with the location and angular position shown in FIG. 7C. In this example situation, the eyes of the end user 50 are looking at the real objects and the virtual object from a perspective (e.g., a first perspective) that is directly at the front face of the real/virtual objects. As previously noted, from this perspective, a GPU (e.g., the GPU 152) will render the image of the virtual object as if the eyes of the end user 50 are looking directly at the front face of the virtual object. As shown in FIG. 7D, this means that the combination of the real object and the rendered virtual object will show all of these real/virtual objects from the first perspective—looking at just the front face of these objects. This means that even though the virtual object has the letters "VO" on the front face and the letter "X" on a side face, the virtual object will be rendered showing only the front face of the virtual object with the letters "VO"—without any part of the side face of the virtual object having the letter "X" being rendered.

Figure 7E:
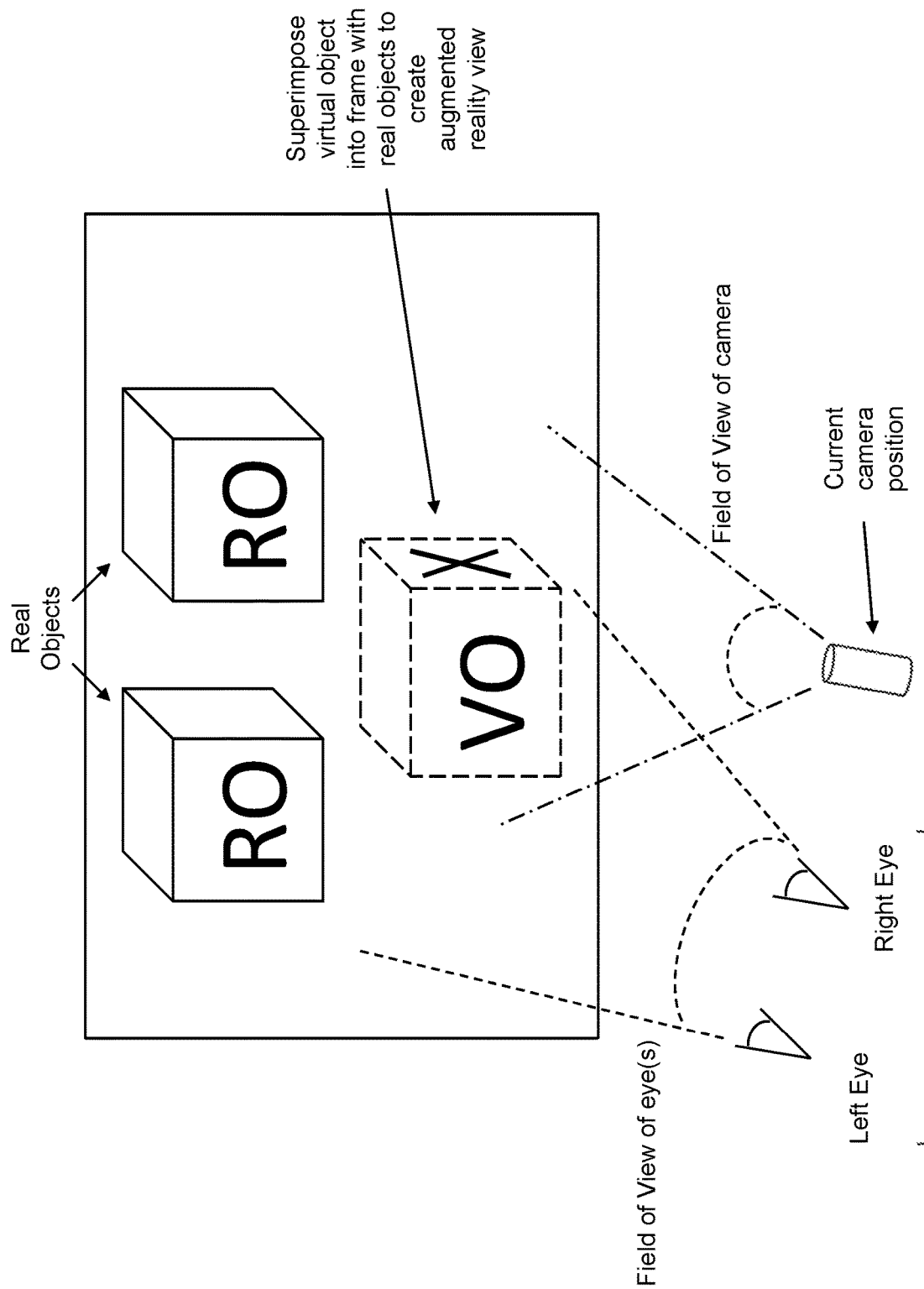

As shown in FIG. 7E, a current location and rotational position of a camera (e.g., the camera 144) is at a different perspective from that of the eyes of the end user 50. In this situation, the perspective of the camera 144 is offset at a certain distance rightwards from the position of the eyes of the end user 50, and is angled to face both the front and right sides of the real objects. This means that the camera 144 will record image frames that capture both the front and right-side faces of the real objects.

Figure 7F:
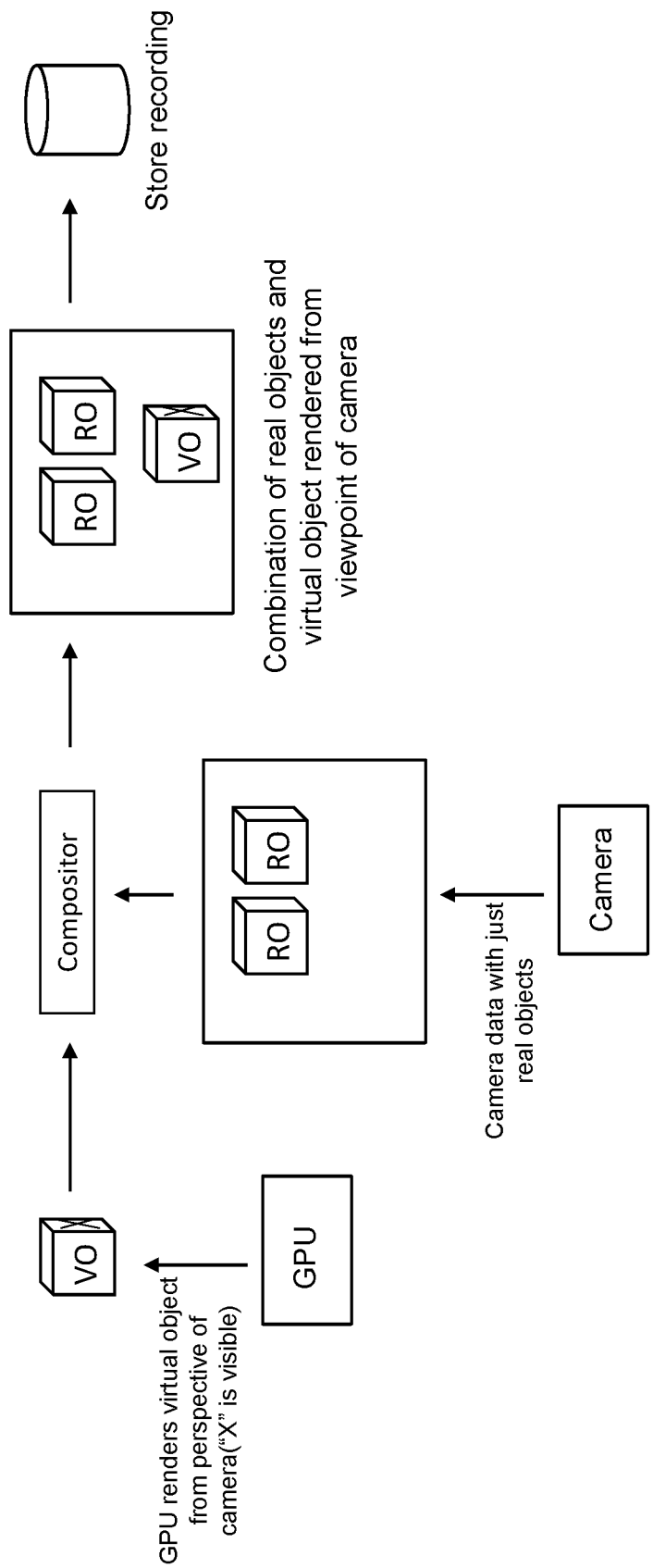

As illustrated in FIG. 7F, the virtual object is rendered from the perspective of the camera 144—instead of just re-using the previously rendered image of the virtual object. This means that the rendered view of the virtual object will now include a view of the front face of the virtual object (having the letters "VO") as well as a partial view of the right-side face of the virtual object (having the letter "X"). This provides a much more accurate view of the virtual object from the perspective of the camera 144. The rendered virtual object is then combined with the real-world image of the real objects by the compositor 164 to form the combined image frame. This combined image frame can then encoded by the media encoder 166 and saved to the recording database 168, where the recording database 168 may be a computer storage medium.

This approach eliminates the type of image artifacts that infected other approaches to AR recording, since there is no longer any mismatch between the perspective of the camera 144 and the perspective of the rendered view of the virtual objects. This approach also removes the need to incur the computing costs to perform warping of the rendered virtual object, since the virtual object is already being rendered from the appropriate perspective.

The processing of the additional rendering of the virtual content can be implemented with an approach that minimizes an overhead incurred by components within the AR processing system 100a and/or 100b. According to some embodiments, gaps in normal GPU processing are leveraged to perform the additional rendering of the virtual content.

Figure 8:
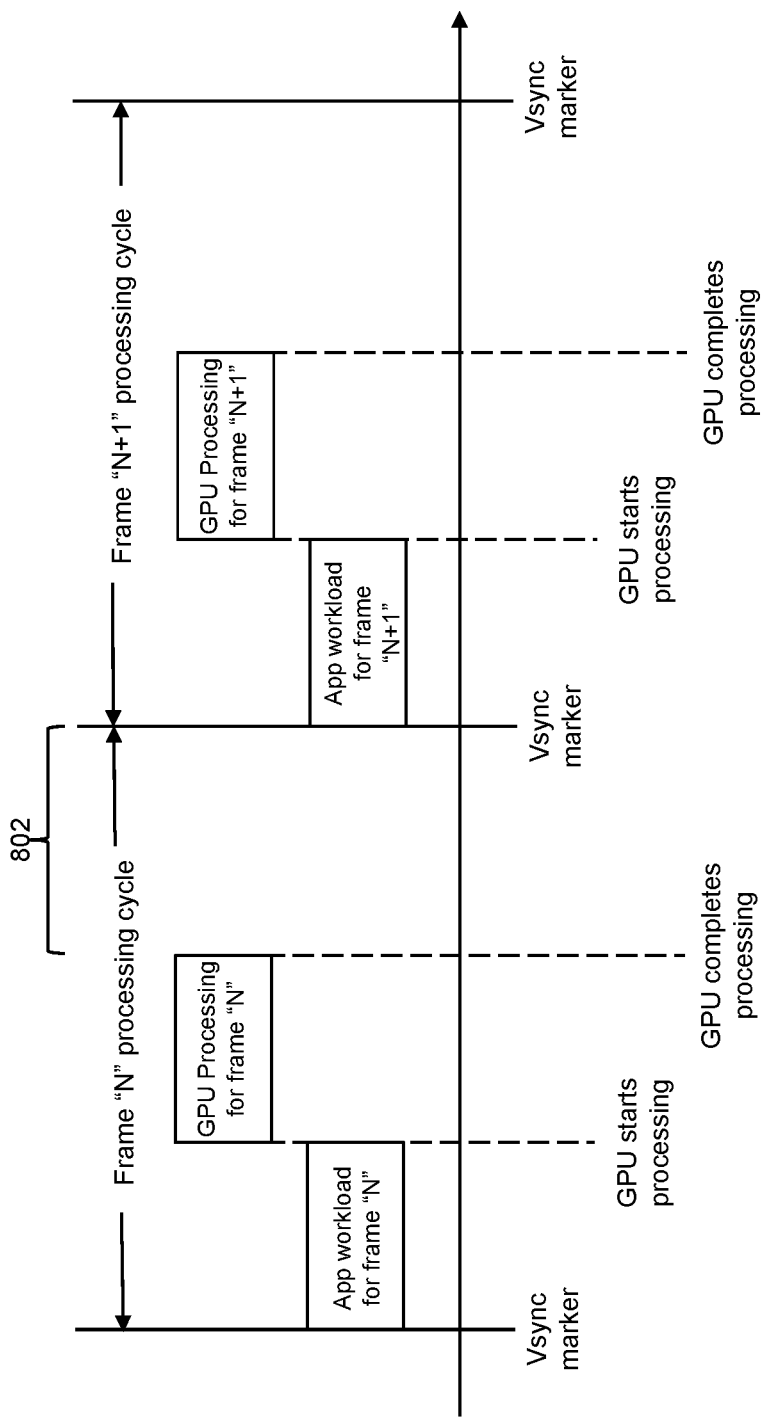
FIG. 8 illustrates an example GPU processing cycle, according to some embodiments.

To explain, first consider a GPU/application processing cycle illustrated in FIG. 8. FIG. 8 shows a sequence of activities that are performed to generate images for successive frames for an AR system. FIG. 8 illustrates two frame processing cycles: frame "N" processing cycle and frame "N+1" processing cycle. The processing cycle for each frame is bounded by a "vsync marker", which identifies an end of processing for a previous frame and a start of processing for a next frame. For the frame "N" processing cycle, in an early part of the processing cycle, an application performs a workload with respect to image frame "N". Within that same processing cycle, a GPU performs operations to render virtual content for the image frame "N" from the perspective of the head and/or the eyes of the end user 50. The rendered virtual content is generated to display on a wearable AR device. This is a critical part of the processing cycle leading up to vsync marker, where the rendered virtual content is readied for display to the user. Some of the work performed at this time period is to obtain the rendered virtual content, match the rendered virtual content to head position by, for example, by warping the rendered virtual content as needed, and provide an image frame including the rendered virtual content to the user. At the point of the vsync marker, the display refreshes and the end user 50 sees the new content and processing starts for the next set of refreshed content.

From this chart, it can be seen that for each frame processing cycle, there is a gap 802 between the time at the end of GPU processing and the time of the vsync marker. This gap is designed to be large enough to ensure that the GPU can finish its work to render the virtual content, hand off that rendered virtual content.

Figure 9A:
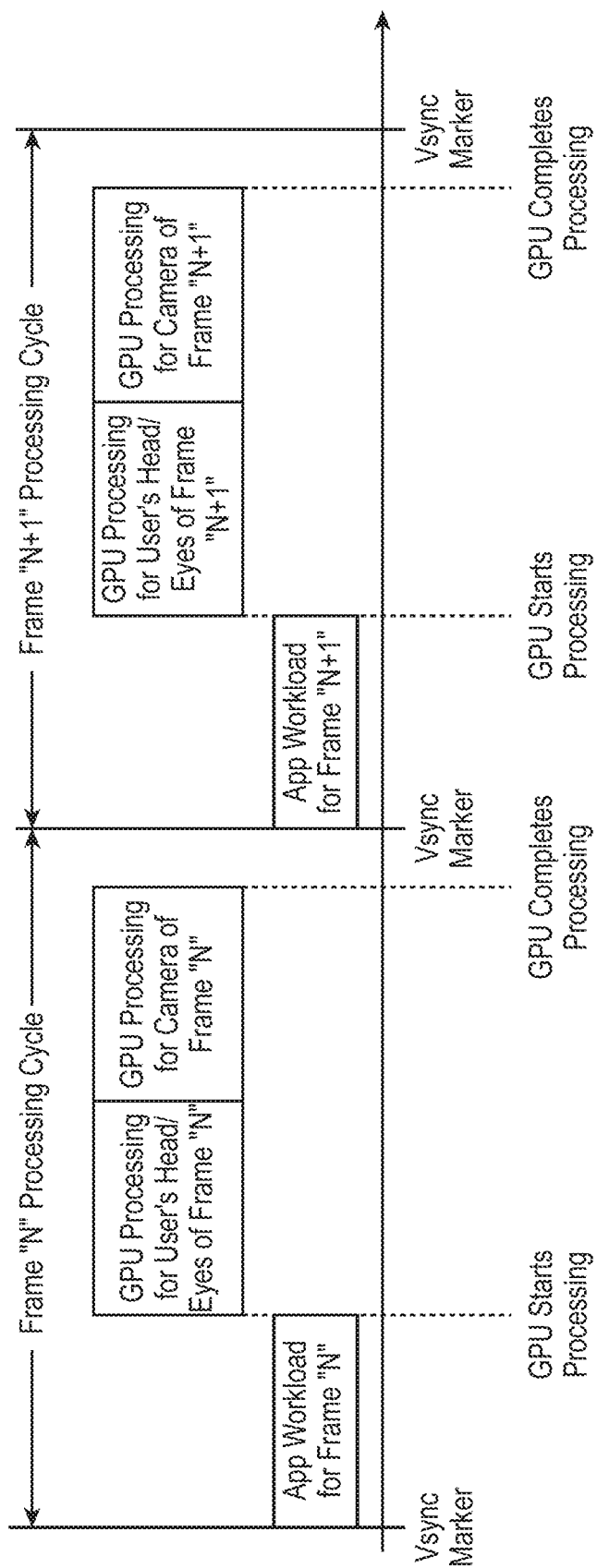
FIG. 9A illustrates an example GPU processing cycle, according to some embodiments.

As shown in FIG. 9A, it is in this gap time period that additional work can be imposed onto the GPU, for example, to render virtual content from the perspective of the camera. This is because, since the GPU had already completed its processing for the current frame "N" for display, the rest of the GPLU cycle should be available for the AR recording processing. In particular, the rest of the current processing cycle can be applied to have the GPU perform additional processing operations to render the virtual content from the perspective of the camera for the current frame "N". For example, for the frame "N" processing cycle, in an early part of the processing cycle, an application performs a workload with respect to the current image frame "N". Within that same processing cycle, a GPU performs operations to render virtual content for the image frame "N" from the perspective of the head and/or the eyes of the end user 50. The rendered virtual content is generated to display on the wearable AR device. Also within the same processing cycle, the GPU performs operations to render the virtual content for the image fame "N" from the perspective of the camera 144.

Figure 9B:
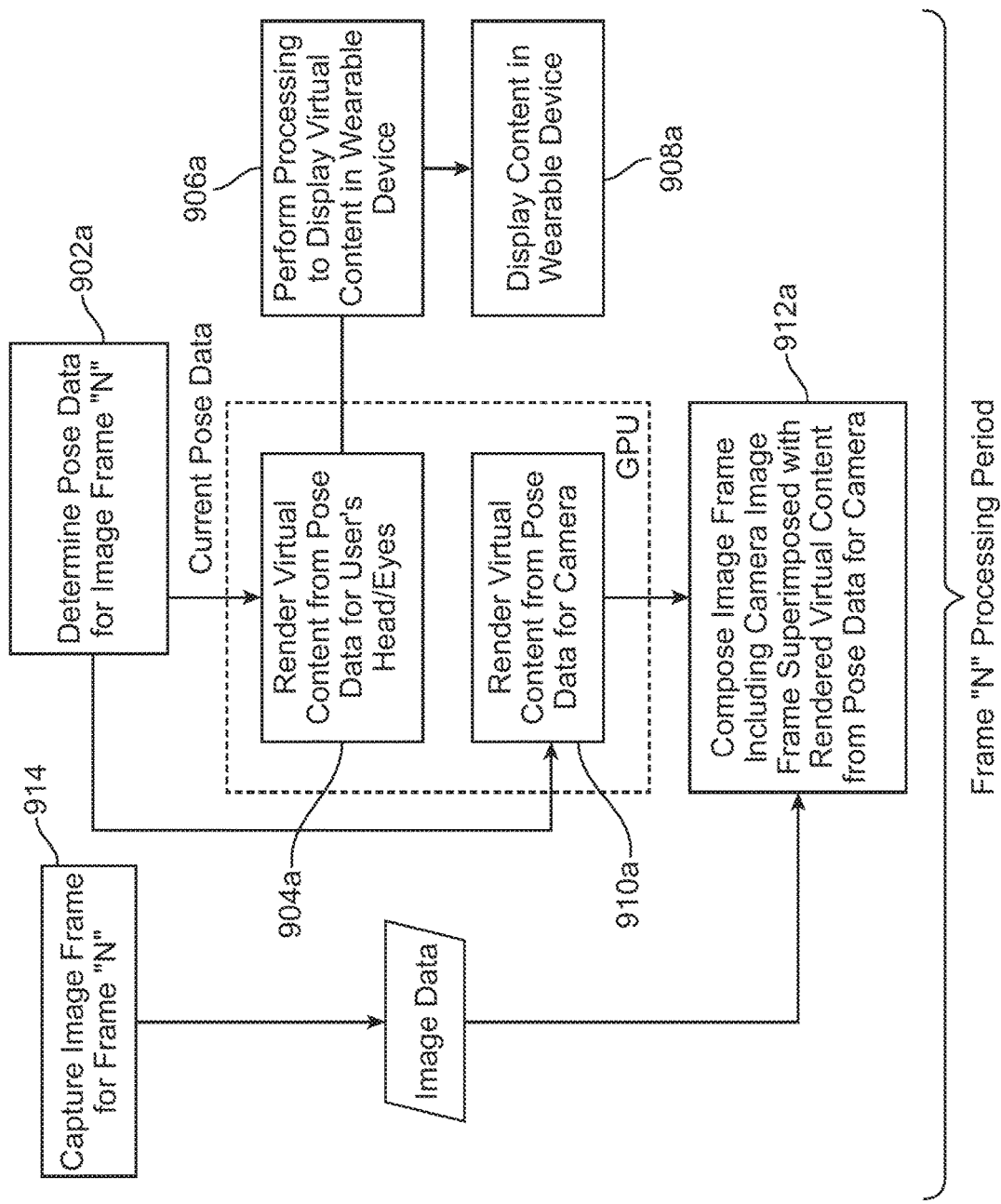
FIG. 9B shows a flow chart of an approach to implement a GPU processing cycle, according to some embodiments.

FIG. 9B shows a flow chart of an approach to implement this aspect, according to some embodiments. For a frame "N" processing period, at 902a, pose data is determined for a current image frame "N". The pose data includes pose data for the head and/or the eyes of the end user 50 that is, at 904a, used by a GPU to render virtual content from the perspective of the head and/or the eyes of the end user 50 for the current frame "N". That rendered content is, at 906a, processed for display to the end user 50. At 908a, the rendered and processed image frame "N" is then displayed to the end user 50 on a wearable AR device.

The pose data that was generated at 902a also includes pose data for the camera 144 that has captured an image for the current image frame "N". That pose data for the camera 144 is used by the GPU in the same frame "N" processing period, where at 910a, the GPU renders the virtual content from the perspective of the camera 144 for the current frame "N".

At 912a, the rendered virtual content from the perspective of the camera 144 is combined with image data captured from the camera 144 at 914 to generate a composite image for an AR recording. This process continues through each succeeding frame if there is a desire to generate the AR recording.

It is noted that one key advantage of this approach is that the camera 144 can be completely decoupled from the wearable AR device and still be used to obtain an AR recording that includes the virtual content. This means that the camera 144 can be placed anywhere in the user's environment, and the AR recording can still be accurately obtained since the system will simply render the virtual content from the perspective of the camera 144. This is advantageous over approaches in which the camera 144 is required to be situated very close to the head and/or the eyes of the end user 50 (since warping tolerance used for the prior warping approach will not effectively generate any results if there is too much distance between the camera 144 and the wearable AR device.

Figure 10A:
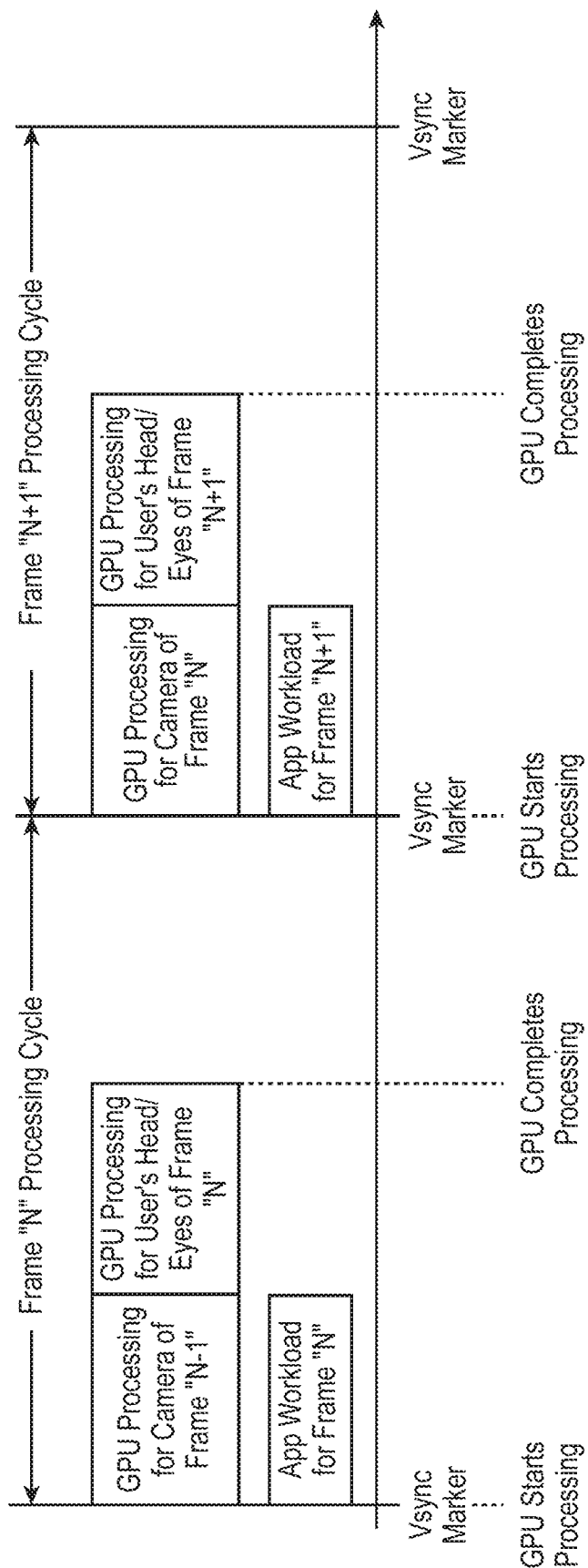
FIGS. 10A-B illustrate example alternative GPU processing cycle, according to some embodiments.

FIG. 10A illustrates an approach to perform the virtual content rendering that leverages the GPU processing gaps, according to some embodiments. The difference between FIG. 9A and FIG. 10A is that instead of generating both sets of virtual content for the same frame in the same frame processing cycle as discussed for FIG. 9A, the approach of FIG. 10A generates virtual content from the perspective of the camera 144 for a given frame in a different frame processing cycle than the virtual content from the perspective the head and/or the eyes of the end user 50 for that same frame.

For example, as illustrated in FIG. 10A, for a frame "N" processing cycle, the GPU processing starts by rendering the virtual content from the perspective of the camera 144 for a previous frame "N–1" during the time that the application workload is processing a workload for a current frame "N". Only after the GPU has finished processing the virtual content from the perspective of the camera 144 for a previous frame "N–1" will the GPU then proceed to render the virtual content from the perspective of the head and/or the eyes of the end user 50 for the current frame "N".

The general idea is that while the AR application is handling the app workload for the current frame "N", the GPU is normally throttled from further processing of any other work and is therefore available for processing. As such, during this throttle period, the GPU can advantageously be tasked to render the virtual content for the previous frame "N–1" from the perspective of the camera 144 for purposes of the AR recording.

In some embodiments, this means that the rendering of the virtual content for the previous frame "N–1" for the AR recording will have a latency period of at least one frame from the current frame "N". However, if the frame rate is fast enough, this amount of latency will not be visible to the user that later views the AR recording. For example, if the AR system has a frame rate of around 60-120 Hz, then the latency for the newly recorded frame will be no larger than 8-16 milliseconds, which is imperceptible to the user. It is noted that any number of frames for the latency period is acceptable so long as the new frame is not off by a period greater than a perceptible level of frames (given the specific frame rate of the system to which the disclosure is applied).

Figure 10B:
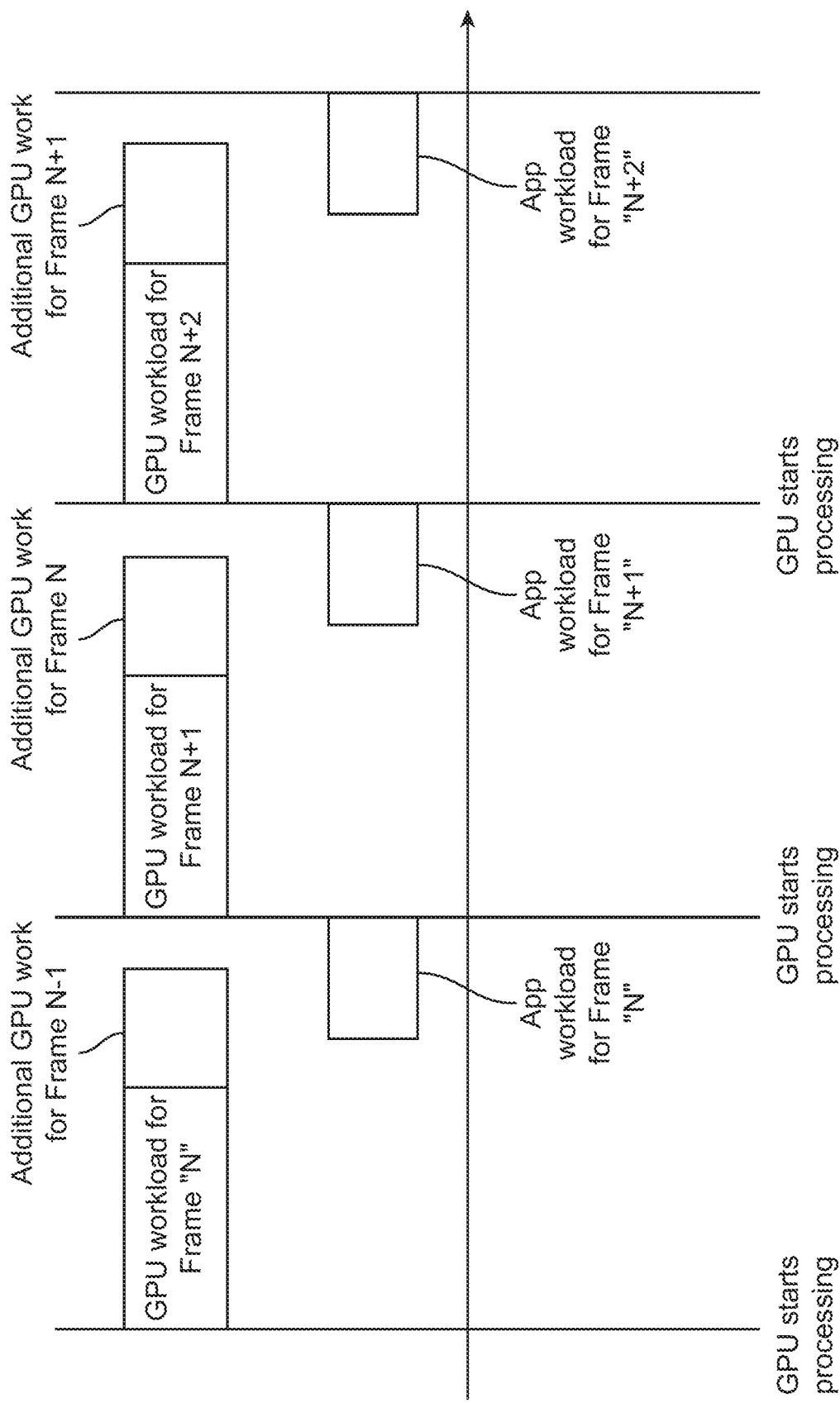

FIG. 10B provides an alternate way to illustrate some embodiments, where the gap time period for the GPU is employed to render virtual content for a previous frame. In particular, FIG. 10B shows that after the GPU has completed its processing for the current frame "N" (and handed off its rendering results for the current frame), the GPU is no longer needed at this point for the current frame "N". At this point, the GPU is normally throttled from further processing of any work and is therefore available for processing. As such, during this throttle period while the previously rendered image for the current frame "N" is being processed in parallel for display, the GPU can advantageously be tasked to render the virtual content for a previous frame "N–1" from the perspective of the camera for purposes of the AR recording.

Figure 10C:
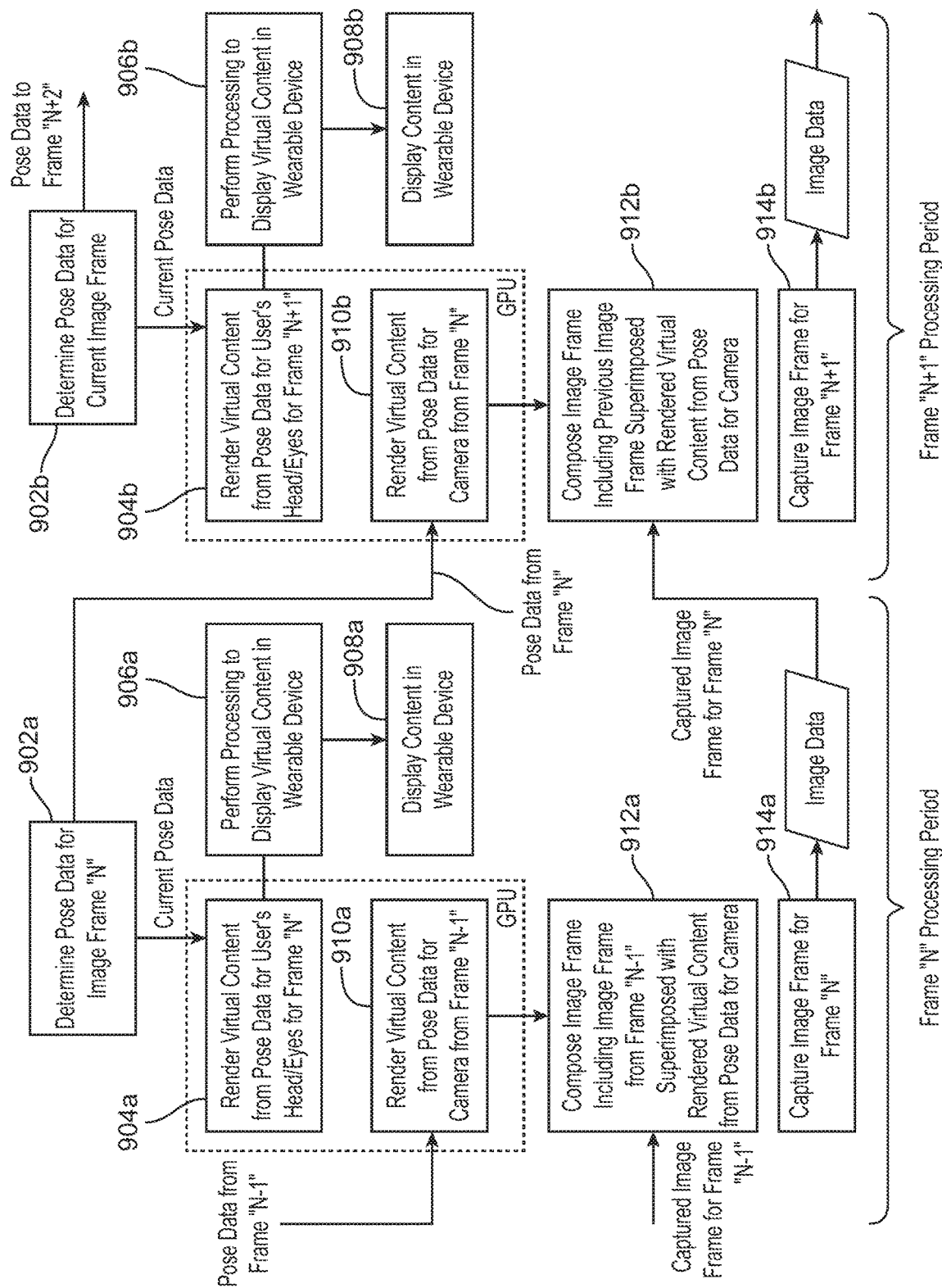
FIG. 10C shows a flow chart of an approach to implement an alternative GPU processing cycle, according to some embodiments.

FIG. 10C shows a flow chart of an approach to implement this aspect, according to some embodiments. The left side of the figure shows the processing that occurs during a current frame processing cycle (e.g., frame "N" processing period), and the right side of the figure shows the processing that occurs during a very next frame processing cycle (e.g., frame "N+1" processing period).

For the frame "N" processing period, at 902a, pose data is determined for a current image frame "N". The pose data includes pose data for the head and/or the eyes of the end user 50 that is, at 904a, used by a GPU to render the virtual content from the perspective of the head and/or the eyes of the end user 50 for the current frame "N". That rendered content is, at 906*a*, processed for display to the end user 50. At 908*a*, the rendered and processed image frame "N" is then displayed to the end user 50 on a wearable AR device.

The pose data that was generated at 902*a* also includes pose data for the camera 144 that has captured an image for the current image frame "N". That pose data for the camera 144 for the current frame "N" is not processed in the frame "N" processing period. Instead, the pose data for the camera 144 is transmitted to the GPU for processing during a frame "N+1" processing period.

For the frame "N+1" processing cycle, at 902*a*, pose data is determined for a current image frame "N+1". The pose data includes pose data for the head and/or the eyes of the end user 50 that is, at 904*b*, used by the GPU to render virtual content from the perspective of the head and/or the eyes of the end user 50 for the current frame "N+1". That rendered content is, at 906*b*, processed for display to the end user 50. At 908*a*, the rendered and processed image frame "N+1" is then displayed to the end user 50 on the wearable AR device.

During that frame "N+1" processing cycle, at 910*b*, the GPU will renders the virtual content from the perspective of the camera 144 from the image frame "N". At 912*b*, virtual content from the perspective of the camera 144 is combined with image data captured from the camera 144 at 914*a* from the frame "N" processing period to generate a composite image for an AR recording. This process continues through each succeeding frame if there is a desire to generate an AR recording.

Therefore, what has been described is an improved approach to generate AR recordings, which resolves the inaccuracies and inefficiencies of prior approaches that have been taken to record AR images and video.

System Architecture Overview

Figure 11:
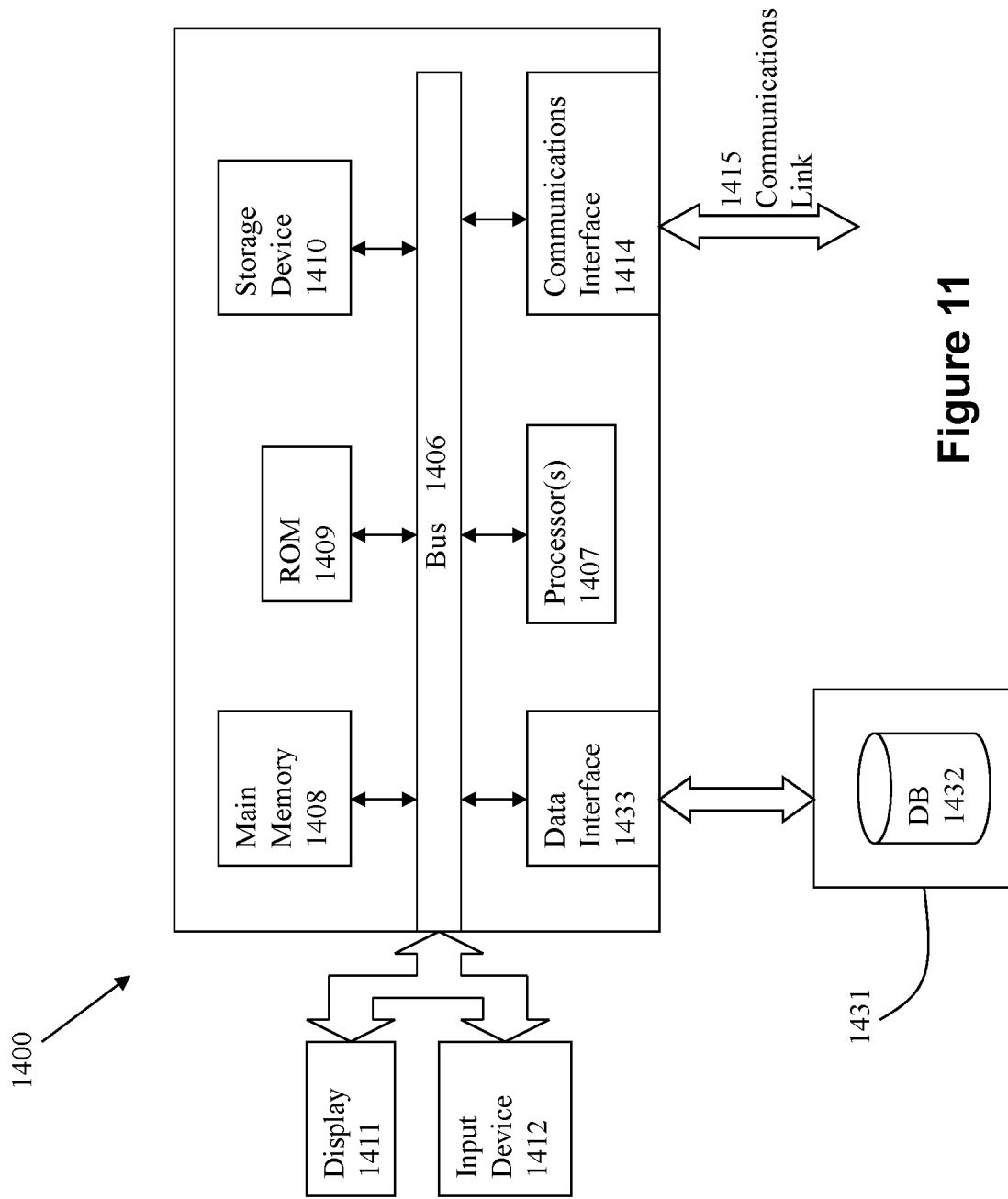
FIG. 11 is a block diagram of an illustrative computing system, according to some embodiments.

FIG. 11 is a block diagram of an illustrative computing system 1400 suitable for implementing an embodiment of the present disclosure for the above-described processing of image data. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the disclosure, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1400. According to other embodiments of the disclosure, two or more computer systems 1400 coupled by communication link 1415 (e.g., LAN, PTSN, or wireless network) may perform the sequence of instructions required to practice the disclosure in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for generating an image recording, comprising
    capturing a camera image frame with a camera;
    identifying pose data that corresponds to the camera image frame, the pose data comprising user pose data and camera pose data, wherein the user pose data is from a different perspective from the camera pose data;
    rendering user pose virtual content for immediate display to a user in an augmented reality (AR) device, wherein the user pose virtual content corresponds to first virtual content from a user's perspective;
    rendering camera pose virtual content, where the camera pose virtual content corresponds to second virtual content from the camera's perspective; and
    composing the image recording by combining the camera image frame with the camera pose virtual content,
    wherein a single inertial measurement unit (IMU) generates both the user pose data and the camera pose data.

2. The method of claim 1, wherein a single graphics processing unit (GPU) processing cycle includes processing to: render the user pose virtual content based on the user pose data, and render the camera pose virtual content based on the camera pose data.

3. The method of claim 2, wherein the user pose virtual content based on the user pose data and the camera pose virtual content based on the camera pose data rendered during the single GPU processing cycle is for a same frame.

4. The method of claim 2, wherein the user pose virtual content based on the user pose data and the camera pose virtual content based on the camera pose data rendered during the single GPU processing cycle is for different frames.

5. The method of claim 1, wherein a compositor generates the image recording by combining the camera image frame with the camera pose virtual content.

6. The method of claim 1, wherein a media encoder encodes one or more image frames that combine the camera image frame with the camera pose virtual content.

7. The method of claim 6, wherein the one or more image frames encoded by the media encoder comprises at least one of a single image frame or a stream of multiple image frames.

8. A computer program product embodied on a non-transitory computer readable medium, the non-transitory computer readable medium having stored thereon a sequence of instructions which, when executed by a processor causes the processor to execute a method for generating an image recording comprising:
   capturing a camera image frame with a camera;
   identifying pose data that corresponds to the camera image frame, the pose data comprising user pose data and camera pose data, wherein the user pose data is from a different perspective from the camera pose data;
   rendering user pose virtual content for immediate display to a user in an augmented reality (AR) device, wherein the user pose virtual content corresponds to first virtual content from a user's perspective;
   rendering camera pose virtual content, where the camera pose virtual content corresponds to second virtual content from the camera's perspective; and
   composing the image recording by combining the camera image frame with the camera pose virtual content,
   wherein a single inertial measurement unit (IMU) generates both the user pose data and the camera pose data.

9. The computer program product of claim 8, wherein a single graphics processing unit (GPU) processing cycle includes processing to: render the user pose virtual content based on the user pose data, and render the camera pose virtual content based on the camera pose data.

10. The computer program product of claim 9, wherein the user pose virtual content based on the user pose data and the camera pose virtual content based on the camera pose data rendered during the single GPU processing cycle is for a same frame.

11. The computer program product of claim 9, wherein the user pose virtual content based on the user pose data and the camera pose virtual content based on the camera pose data rendered during the single GPU processing cycle is for different frames.

12. The computer program product of claim 8, wherein a compositor generates the image recording by combining the camera image frame with the camera pose virtual content.

13. The computer program product of claim 8, wherein a media encoder encodes one or more image frames that combine the camera image frame with the camera pose virtual content.

14. The computer program product of claim 13, wherein the one or more image frames encoded by the media encoder comprises at least one of a single image frame or a stream of multiple image frames.

15. A system for generating an image recording, comprising
   an augmented realty display device that displays three dimensional content;
   a camera that captures a camera image frame;
   an inertial measurement unit (IMU) that identifies pose data corresponding to the camera image frame, the pose data comprising user pose data and camera pose data, wherein the user pose data is from a different perspective from the camera pose data;
   a single graphics processing unit (GPU) that renders both user pose virtual content and camera pose virtual content, the user pose virtual content being rendered for immediate display to a user in the augmented reality device, wherein the user pose virtual content corresponds to first virtual content from a user's perspective and the camera pose virtual content corresponds to second virtual content from the camera's perspective; and
   a compositor that composes the image recording by combining the camera image frame with the camera pose virtual content.

16. The system of claim 15, further comprising a media encoder that encodes one or more image frames that combine the camera image frame with the camera pose virtual content.

17. The system of claim 16, wherein the one or more image frames encoded by the media encoder comprises at least one of a single image frame or a stream of multiple image frames.

18. The system of claim 15, wherein a single GPU processing cycle includes processing to: render the user pose virtual content based on the user pose data, and render the camera pose virtual content based on the camera pose data.

19. The system of claim 18, wherein the user pose virtual content based on the user pose data and the camera pose virtual content based on the camera pose data rendered during the single GPU processing cycle is for a same frame.

20. The system of claim 18, wherein the user pose virtual content based on the user pose data and the camera pose virtual content based on the camera pose data rendered during the single GPU processing cycle is for different frames.

21. The system of claim 15, wherein the compositor generates the image recording by combining the camera image frame with the camera pose virtual content.

* * * * *